United States Patent
Hottovy et al.

(10) Patent No.: US 9,932,422 B2
(45) Date of Patent: Apr. 3, 2018

(54) FLASHLINE HEATER SYSTEM AND METHOD

(71) Applicant: Chevron Phillips Chemical Company LP, The Woodlands, TX (US)

(72) Inventors: John D. Hottovy, Kingwood, TX (US); Scott E. Kufeld, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 80 days.

(21) Appl. No.: 15/069,778

(22) Filed: Mar. 14, 2016

(65) Prior Publication Data
US 2016/0264693 A1    Sep. 15, 2016

Related U.S. Application Data

(63) Continuation of application No. 14/072,649, filed on Nov. 5, 2013, now Pat. No. 9,302,244, which is a
(Continued)

(51) Int. Cl.
| | |
|---|---|
| *B01J 8/00* | (2006.01) |
| *B01J 19/00* | (2006.01) |
(Continued)

(52) U.S. Cl.
CPC ............ *C08F 110/02* (2013.01); *B01D 1/04* (2013.01); *B01D 1/24* (2013.01); *B01J 8/005* (2013.01); *B01J 19/06* (2013.01); *B01J 19/1837* (2013.01); *C08F 6/003* (2013.01); *B01J 2219/00006* (2013.01); *C08F 10/00* (2013.01)

(58) Field of Classification Search
CPC ... B01D 1/00; B01D 1/04; B01D 1/24; B01D 1/22; B01J 8/00; B01J 8/005; B01J 19/00; B01J 19/06; B01J 19/018; B01J 19/1818; B01J 19/1837; B01J 2219/00–2219/00006; B01J 19/18; B01J 19/24; C08F 2/00; C08F 2/12; C08F 2/14; C08F 6/00; C08F 6/003; C08F 110/00; C08F 110/02
See application file for complete search history.

(56) References Cited

U.S. PATENT DOCUMENTS

| | | | |
|---|---|---|---|
| 2,825,721 | A | 3/1958 | Hogan et al. |
| 3,167,113 | A | 1/1965 | Kleiss |
(Continued)

FOREIGN PATENT DOCUMENTS

| | | |
|---|---|---|
| EP | 1344563 | 9/2003 |
| EP | 1415999 | 6/2004 |
(Continued)

OTHER PUBLICATIONS

International Patent Application PCT/US2012/043215, Search Report dated Nov. 21, 2012.

*Primary Examiner* — Natasha Young
(74) *Attorney, Agent, or Firm* — Fletcher Yoder, P.C.

(57) ABSTRACT

The present embodiments provide a system and method for separation within a polymer production process. Specifically, a flashline heater configured according to present embodiments may provide more time than is required for complete vaporization of liquid hydrocarbons that are not entrained within a polymer fluff produced within a polymerization reactor. Such extra time may allow for liquid hydrocarbons that are entrained within the polymer fluff to be vaporized.

19 Claims, 3 Drawing Sheets

Related U.S. Application Data continuation of application No. 13/173,881, filed on Jun. 30, 2011, now Pat. No. 8,597,582.

(51) Int. Cl.

| | | |
|---|---|---|
| *B01J 19/18* | (2006.01) | |
| *B01J 19/24* | (2006.01) | |
| *B01D 1/00* | (2006.01) | |
| *B01D 1/04* | (2006.01) | |
| *B01D 1/22* | (2006.01) | |
| *B01D 1/24* | (2006.01) | |
| *C08F 2/14* | (2006.01) | |
| *C08F 6/00* | (2006.01) | |
| *C08F 10/00* | (2006.01) | |
| *C08F 110/02* | (2006.01) | |
| *B01J 19/06* | (2006.01) | |
| *C08F 2/00* | (2006.01) | |
| *C08F 2/12* | (2006.01) | |
| *C08F 110/00* | (2006.01) | |
| *C08L 23/00* | (2006.01) | |

(56) References Cited

U.S. PATENT DOCUMENTS

| | | |
|---|---|---|
| 3,195,613 A | 7/1965 | Hawkins |
| 3,234,994 A | 2/1966 | Dance |
| 3,248,179 A | 4/1966 | Norwood |
| 3,290,278 A | 12/1966 | Rice et al. |
| 4,022,580 A | 5/1977 | Rush |
| 4,126,743 A | 11/1978 | Shiomura et al. |
| 4,136,061 A | 1/1979 | Hogan |
| 4,184,036 A | 1/1980 | Shiomura et al. |
| 4,211,863 A | 7/1980 | McDaniel et al. |
| 4,424,341 A | 1/1984 | Hanson et al. |
| 4,654,801 A | 3/1987 | Stewart et al. |
| 4,676,870 A | 6/1987 | Stewart et al. |
| 4,900,498 A | 2/1990 | Smith |
| 5,183,866 A | 2/1993 | Hottovy |
| 5,207,929 A | 5/1993 | Sung et al. |
| 5,387,659 A | 2/1995 | Hottovy et al. |
| 5,411,925 A | 5/1995 | Geerts et al. |
| 5,455,314 A | 10/1995 | Burns et al. |
| 5,565,174 A | 10/1996 | Burns et al. |
| 5,565,175 A | 10/1996 | Hottovy et al. |
| 5,575,979 A | 11/1996 | Hanson |
| 5,597,892 A | 1/1997 | Hanson |
| 5,624,877 A | 4/1997 | Bergmeister et al. |
| 5,648,439 A | 7/1997 | Bergmeister et al. |
| 5,708,082 A | 1/1998 | Huang |
| 5,965,675 A | 10/1999 | Kellum et al. |
| 6,005,061 A | 12/1999 | Geerts et al. |
| 6,042,790 A | 3/2000 | Hottovy et al. |
| 6,045,661 A | 4/2000 | Kreischer et al. |
| 6,051,631 A | 4/2000 | Hottovy |
| 6,114,501 A | 9/2000 | Hottovy et al. |
| 6,204,344 B1 | 3/2001 | Kendrick et al. |
| 6,239,225 B1 | 5/2001 | Michels et al. |
| 6,239,235 B1 | 5/2001 | Hottovy et al. |
| 6,239,300 B1 | 5/2001 | Stouffer et al. |
| 6,262,191 B1 | 7/2001 | Hottovy et al. |
| 6,281,300 B1 | 8/2001 | Kendrick |
| 6,319,997 B1 | 11/2001 | Kendrick et al. |
| 6,380,325 B1 | 4/2002 | Kendrick |
| 6,420,497 B1 | 7/2002 | Kufeld et al. |
| 6,559,247 B2 | 5/2003 | Kufeld et al. |
| 6,670,431 B2 | 12/2003 | Kendrick et al. |
| 6,723,804 B1 | 4/2004 | Battiste |
| 6,743,869 B2 | 6/2004 | Franklin et al. |
| 6,753,387 B1 | 6/2004 | Tait et al. |
| 6,800,698 B2 | 10/2004 | Kendrick et al. |
| 6,806,324 B2 | 10/2004 | Hottovy et al. |
| 6,815,511 B2 | 11/2004 | Verser et al. |
| 6,818,186 B2 | 11/2004 | Burns et al. |
| 6,833,415 B2 | 12/2004 | Kendrick et al. |
| 6,838,531 B2 | 1/2005 | Reid et al. |
| 6,858,682 B2 | 2/2005 | Kendrick et al. |
| 6,908,971 B2 | 6/2005 | Burns et al. |
| 6,926,868 B2 | 8/2005 | Kendrick et al. |
| 6,953,553 B2 | 10/2005 | Reid et al. |
| 6,967,230 B2 | 11/2005 | Hottovy et al. |
| 7,005,485 B2 | 2/2006 | Burns et al. |
| 7,014,821 B2 | 3/2006 | Hottovy et al. |
| 7,015,289 B2 | 3/2006 | Hottovy et al. |
| 7,033,545 B2 | 4/2006 | Kufeld et al. |
| 7,034,090 B2 | 4/2006 | Kendrick |
| 7,037,980 B2 | 5/2006 | Stacy et al. |
| 7,087,685 B2 | 8/2006 | Burns et al. |
| 7,106,437 B2 | 9/2006 | Marrow et al. |
| 7,109,290 B2 | 9/2006 | McElvain et al. |
| 7,179,426 B2 | 2/2007 | Hottovy et al. |
| 7,315,369 B2 | 1/2008 | Battiste |
| 7,400,941 B2 | 7/2008 | Battiste |
| 7,417,095 B2 | 8/2008 | Battiste |
| 7,433,761 B2 | 10/2008 | Battiste |
| 7,505,127 B2 | 3/2009 | Marrow et al. |
| 7,505,129 B2 | 3/2009 | Marrow et al. |
| 7,517,947 B2 | 4/2009 | McElvain et al. |
| 7,524,904 B2 | 4/2009 | Verser et al. |
| 7,531,606 B2 | 5/2009 | Hendrickson |
| 7,547,750 B2 | 6/2009 | McElvain et al. |
| 7,572,866 B2 | 8/2009 | Lee et al. |
| 7,615,596 B2 | 11/2009 | Burns et al. |
| 7,645,841 B2 | 1/2010 | Shaw et al. |
| 7,718,732 B2 | 5/2010 | Lee et al. |
| 7,736,597 B2 | 6/2010 | Hottovy et al. |
| 7,741,430 B2 | 6/2010 | Walworth |
| 7,750,095 B2 | 7/2010 | Martin |
| 7,759,457 B2 | 7/2010 | Walworth |
| 7,781,546 B2 | 8/2010 | Lee et al. |
| 7,943,727 B2 | 5/2011 | Marissal et al. |
| 7,957,947 B2 | 6/2011 | Odi |
| 7,964,699 B2 | 6/2011 | Marissal et al. |
| 7,999,044 B2 | 8/2011 | Hottovy et al. |
| 8,871,886 B1 | 10/2014 | Hottovy et al. |
| 2001/0039329 A1 | 11/2001 | Wepener et al. |
| 2003/0109651 A1 | 6/2003 | Kufeld et al. |
| 2004/0116597 A1 | 6/2004 | Reid et al. |
| 2004/0116625 A1 | 6/2004 | Hottovy et al. |
| 2004/0136881 A1 | 7/2004 | Verser et al. |
| 2004/0192860 A1 | 9/2004 | Hottovy et al. |
| 2004/0198927 A1 | 10/2004 | Battiste |
| 2004/0230031 A1 | 11/2004 | Hottovy et al. |
| 2005/0091021 A1 | 4/2005 | Gupta et al. |
| 2005/0095176 A1 | 5/2005 | Hottovy |
| 2005/0186126 A1 | 8/2005 | Burns et al. |
| 2006/0045823 A1 | 3/2006 | Shaw et al. |
| 2006/0063896 A1 | 3/2006 | McElvain et al. |
| 2006/0100399 A1 | 5/2006 | Shaw |
| 2006/0159595 A1 | 7/2006 | Hottovy et al. |
| 2007/0078238 A1 | 4/2007 | Burns et al. |
| 2007/0142576 A1 | 6/2007 | Tait et al. |
| 2009/0037027 A1 | 2/2009 | Battiste |
| 2009/0164046 A1 | 6/2009 | Benham et al. |
| 2009/0228259 A1 | 9/2009 | Gupta et al. |
| 2010/0056707 A1 | 3/2010 | Hottovy et al. |
| 2010/0056732 A1 | 3/2010 | McElvain et al. |
| 2010/0322836 A1 | 12/2010 | Benham et al. |
| 2011/0028684 A1 | 2/2011 | Marissal et al. |
| 2011/0166313 A1 | 7/2011 | Marissal et al. |
| 2013/0005929 A1 | 1/2013 | Hottovy et al. |
| 2014/0121334 A1 | 5/2014 | Kufeld et al. |

FOREIGN PATENT DOCUMENTS

| | | |
|---|---|---|
| EP | 1860126 | 11/2007 |
| EP | 1918308 | 5/2008 |
| GB | 991089 | 5/1965 |
| GB | 2028836 | 3/1980 |
| GB | 2157701 | 10/1985 |
| WO | WO 99/47251 | 9/1999 |

(56) References Cited

FOREIGN PATENT DOCUMENTS

| WO | WO 00/53306 A1    | 9/2000 |
|----|-------------------|--------|
| WO | WO 2004/031245 A1 | 9/2004 |
| WO | WO 2008052943     | 5/2008 |

FLASHLINE HEATER SYSTEM AND METHOD

CROSS-REFERENCE TO RELATED APPLICATIONS

This application is a continuation of U.S. patent application Ser. No. 14/072,649, entitled "FLASHLINE HEATER SYSTEM AND METHOD," filed on Nov. 5, 2013, now U.S. Pat. No. 9,302,244, which is a continuation of U.S. patent application Ser. No. 13/173,881, entitled "FLASHLINE HEATER SYSTEM AND METHOD," filed on Jun. 30, 2011, now U.S. Pat. No. 8,597,582, which are incorporated by reference herein in their entirety for all purposes.

BACKGROUND

The present disclosure relates generally to polymer production and, more specifically, to removing diluent from slurry discharged from a polymerization reactor.

This section is intended to introduce the reader to aspects of art that may be related to aspects of the present approaches, which are described and/or claimed below. This discussion is believed to be helpful in providing the reader with background information to facilitate a better understanding of the various aspects of the embodiments described herein. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefins is that they are generally non-reactive with goods or products which they may contact. This allows polyolefin products to be used in residential, commercial, and industrial contexts, such as food and beverage storage and transportation, consumer electronics, agriculture, shipping, vehicular construction and so forth. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. Typically, these processes are performed at petrochemical facilities, which have ready access to short-chain olefin molecules such as ethylene, propylene, butene, pentene, hexene, octene, decene, and other building blocks of the much longer polyolefins. Such monomers and comonomers may be polymerized in a liquid-phase polymerization reactor and/or gas-phase polymerization reactor to form a product including polymer (polyolefin) solid particulates, which are typically referred to as polymer fluff or fluff. The fluff may possess one or more melt, physical, rheological, and/or mechanical properties of interest, such as density, melt index (MI), melt flow rate (MFR), modulus, and crystallinity. The reaction conditions within the reactor, such as temperature, pressure, chemical concentrations, polymer production rate, and so forth, may also be a factor in achieving the desired fluff properties.

In addition to the one or more olefin monomers, a catalyst for facilitating the polymerization of the monomers may be added to the reactor. For example, the catalyst may be a particle added via a reactor feed stream and, once added, suspended in a fluid medium (e.g., a diluent, a monomer, or both) within the reactor. One example of such a catalyst is a chromium oxide containing hexavalent chromium on a silica support. In some polymerization processes, a diluent may be introduced into the reactor. The diluent may be an inert hydrocarbon, such as isobutane, propane, n-pentane, i-pentane, neopentane, and n-hexane. Such diluents may be selected such that they are in the liquid phase under reactor conditions. However, some polymerization processes may not employ a separate diluent. For example, in some cases of polypropylene production, the propylene monomer may itself act as a diluent.

The high demand of polymers produced by processes such as these often require a large amount of polymer to be so produced in a relatively short amount of time. Accordingly, some reactors may operate on a substantially continuous basis, where the reactor receives a steady stream of polymerization components (e.g., monomer, diluent, catalyst) and has a concomitant steady discharge. For example, the discharge of the reactor typically includes the polymer fluff as well as non-polymer components, such as unreacted olefin monomer (and comonomer), diluent, and so forth. In the case of polyethylene production, the non-polymer components typically include a primary diluent, such as isobutane, having a small amount of unreacted ethylene (e.g., 5 wt. %). This discharge stream may be continually processed or processed in large batches, such as by a diluent/monomer recovery system, to separate the non-polymer components from the polymer fluff. The recovered diluent, unreacted monomer, and other non-polymer components from the recovery system may be treated, such as by treatment beds and/or a fractionation system, and ultimately returned as purified or treated feed to the reactor. Some of the components may be flared or returned to the supplier, such as to an olefin manufacturing plant or petroleum refinery. As for the recovered polymer (solids), the polymer may be treated to deactivate residual catalyst, remove entrained hydrocarbons, dry the polymer, and pelletize the polymer in an extruder, before the polymer is sent to a customer.

The competitive business of polyolefin production continuously drives manufacturers to improve their processes in order to lower operating and capital costs. In an industry where billions of pounds of polyolefin product are produced per year, small incremental improvements, for example, in catalyst activity, monomer yield, energy efficiency, diluent recovery, and so forth, can generate significant cost savings in the manufacture of polyolefins. Accordingly, there is a need for increased efficiency in polymer production and treatment.

BRIEF DESCRIPTION OF THE DRAWINGS

Advantages of the present technique may become apparent upon reading the following detailed description and upon reference to the drawings in which.

DETAILED DESCRIPTION OF SPECIFIC EMBODIMENTS

Figure 1:
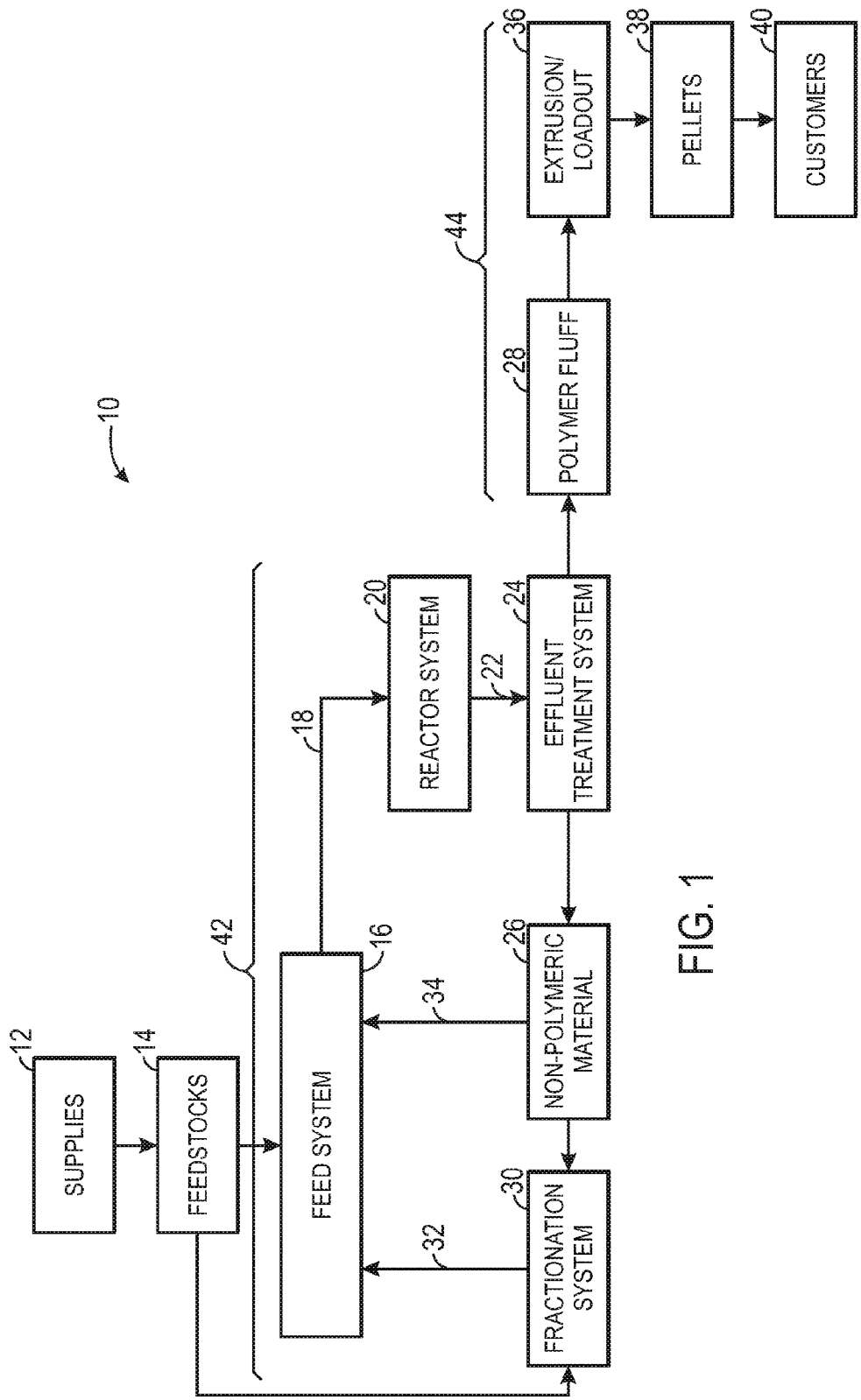
FIG. 1 is a block flow diagram depicting a polyolefin manufacturing system for the continuous production of polyolefins in accordance with an embodiment of the present techniques.

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates to increasing diluent recovery and to reducing associated compression costs. In accordance with present embodiments, a flashline heater that fluidly couples a polyolefin (product) slurry discharge of a polymerization reactor to a downstream flash chamber that separates the polyolefin from vaporized diluent. The flashline heater is sized to provide greater residence time than is sufficient for full vaporization. In one embodiment, the design may be based, in part, on the dimensions (e.g., internal diameter and/or length) of the flashline heater and the amount of energy used to vaporize the liquid in the slurry. A greater percent of a vaporized liquid (e.g., diluent and monomer) is recovered overhead in the flash chamber and less residual liquid exits the flash chamber bottoms with polyolefin fluff solids. Therefore, in some embodiments, the size of the compressor used to pressure recover hydrocarbon from the downstream purge column is advantageously reduced, decreasing the capital and operating costs in the manufacture of polyolefin.

In typical configurations, flashline heater diameters are sufficiently small to cause a discharge from a reactor to have a high velocity. The high velocity may be advantageous for high wall-to-slurry heat transfer coefficients, as well as for transport of the fluff solids. Further, smaller diameter flashline heaters may decrease costs associated with reactor system construction, as well as the footprint of the reactor system. However, it is now recognized that smaller diameter and/or length flashline heaters often result in a polymer fluff that is not substantially dry, which increases associated liquid recovery and compression costs while lowering efficiency. For example, in polyethylene production systems, the volatilization of isobutane diluent away from the polymer fluff may use approximately 110 BTU per lb of diluent. In most situations, the isobutane and other diluent components obtain this energy by a reduction in temperature and/or by heat transfer (energy absorption) through conduction with polyethylene fluff particles, as well as by receiving energy (e.g., thermal energy) transferred through the wall of the flashline heater. Since the density of vapor is much less than the density of liquid diluent or the solid polymer, the vapor phase is the primary phase in convective heat transfer contact with the flashline wall. Thus, the vapor receives a substantial portion, if not all, of the energy from the heated wall of the flashline heater. Thus, in traditional configurations, flash gas temperatures may be between approximately 10° F. and 40° F. higher than the temperature of the polymer fluff. Conversely, flashline heaters consistent with the present techniques provide flash gas and substantially dry polymer fluff with substantially equal temperatures (i.e., less than about 10° F. difference), substantially equilibrated temperatures, and so forth. Specifically, in some embodiments, the temperature difference upon exiting the flashline heater may be from about 0° F. to 10° F. For example, the temperature difference may be about 5° F., or may be about 0° F. in configurations where complete volatilization of the diluent within the flashline is realized.

As noted above, the present disclosure provides a flashline heater having an increased length and/or diameter compared to traditional configurations, as well as heat-variable segments, which may reduce costs associated with processing the discharge from a polymerization reactor. FIG. 1 depicts a manufacturing for producing polyolefins, such as polyethylene homopolymer, copolymer, and/or terpolymer, among others, in which a flashline heater according to the present technique is employed. Various suppliers 12 may provide reactor feedstocks 14 to the manufacturing system 10 via pipelines, trucks, cylinders, drums, and so forth. The suppliers 12 may include off-site and/or on-site facilities, such as olefin plants, refineries, catalyst plants, and the like. Examples of possible feedstocks 14 include olefin monomers and comonomers (e.g., ethylene, propylene, butene, hexene, octene, and decene), diluents (e.g., propane, isobutane, n-hexane, and n-heptane), chain transfer agents (e.g., hydrogen), catalysts (e.g., Ziegler catalysts, Ziegler-Natta catalysts, chromium catalysts, and metallocene catalysts), co-catalysts (e.g., triethylaluminum alkyl, triethylboron, and methyl aluminoxane), and other additives.

According to certain embodiments, ethylene feedstock may be supplied by one or more pipelines at approximately 55 bar-100 bar (e.g., approximately 60 bar to 90 bar or 70 to 80 bar), corresponding to between approximately 800 pounds per square inch gauge (psig)- and 1450 psig. The ethylene feedstock may be provided at a temperature of between approximately 7° C. and 18° C. (45° F.-65° F.). In another example, hydrogen feedstock may be supplied by pipeline at between approximately 62 bar and 69 bar (between about 900 psig and 1000 psig) at a temperature between approximately 32° C. and 43° C. (between approximately 90° F. and 110° F.). As may be appreciated, the types, combinations, and/or supply methods of the feedstocks may vary depending on factors, such as production capacity, location, design criteria, and the desired type of polyolefin product, among others.

The suppliers 12 may provide the feedstocks 14 to a reactor feed system 16 where the feedstocks 14 may be stored, such as in monomer storage and feed tanks, diluent vessels, catalyst tanks, co-catalyst cylinders and tanks, and so forth. Within the feed system 16, the feedstocks 14 may be treated and/or processed to produce feed streams 18 for a reactor system 20. For example, the feed system 16 may include treatment beds (e.g., molecular sieve beds, aluminum packing, etc.) that remove catalyst poisons from the feedstocks 14. According to certain embodiments, the catalyst poisons may include water, oxygen, carbon monoxide, carbon dioxide, and organic compounds containing sulfur, oxygen, or halogens, among others.

The feed system 16 also may prepare or condition the feedstocks 14 for addition to polymerization reactors in the reactor system 20. For example, a catalyst may be activated and then mixed with diluent (e.g., isobutane or hexane) or mineral oil in catalyst preparation tanks. Further, the feed system 16 may meter and control the addition rate of the feedstocks 14 into the reactor system 20 to maintain the desired reactor stability and/or to achieve the desired polyolefin properties or production rate.

In addition to processing the feedstocks 14, the feed system 16 may store, treat, and meter recovered reactor effluent for recycle to the reactor system 20. For example, diluent may be recovered from the reactor effluent and recycled to the reactor system 20. According to certain embodiments, only a relatively small amount of fresh make-up diluent may be utilized in the feedstocks 14, while a majority of the diluent fed to the reactor system 20 may be recovered from the reactor effluent.

In summary, the feedstocks 14 and the recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. The feed streams 18 may be liquid, gaseous, or a supercritical fluid, depending on the type of reactor or reactors within the reactor system 20.

The reactor system 20 may include one or more polymerization reactors, such as liquid-phase reactors, gas-phase reactors, or a combination thereof. Multiple reactors may be arranged in series, in parallel, or in any other suitable combination or configuration. Within the polymerization reactors, one or more olefin monomers and/or comonomers may be polymerized to form a product containing polymer particulates, typically called fluff or granules. According to certain embodiments, the olefin monomers and comonomers may include 1-olefins having up to 10 carbon atoms per molecule and typically no branching nearer the double bond than the 4-position. For example, the monomers and comonomers may include one or more of ethylene, propylene, butene, 1-pentene, 1-hexene, 1-octene, and/or 1-decene. The fluff may possess one or more melt, physical, rheological, and/or mechanical properties of interest, such as density, melt index (MI), melt flow rate (MFR), copolymer and/or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

The catalyst within the feed stream 18 may facilitate polymerization of the monomer within the reactor vessels. According to certain embodiments, the catalyst may include particles suspended in the fluid medium within the reactor. In general, Ziegler catalysts, Ziegler-Natta catalysts, metallocenes, and other well-known polyolefin catalysts, as well as co-catalysts, may be used. According to certain embodiments, the catalyst may be a chromium oxide catalyst containing hexavalent chromium on a silica support.

The diluent within the feed stream 18 may be used to suspend the catalyst particles and the formed polymer particles within the reactor vessels. According to certain embodiments, the diluent may be an inert hydrocarbon that is liquid at reaction conditions, such as one or more of isobutane, propane, n-butane, n-pentane, i-pentane, neopentane, n-hexane, cyclohexane, cyclopentane, methylcyclopentane, and/or ethylcyclohexane, among others.

One or more motive devices may be present within the reactor vessels in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polymer particles, or other solid particulates suspended within the fluid medium, through the closed loop of the reactor.

The formed polymer particles, as well as non-polymer components, such as the diluent, unreacted monomer/comonomer, and residual catalyst, may exit the reactor system 20 as effluent 22. After leaving the reactor system 20, the effluent 22 may be subsequently processed, such as by an effluent treatment system 24, to separate the non-polymer components 26 (e.g., diluent, unreacted monomer, and comonomer) from the formed polymer particles. After separation, the formed polymer particles may exit the effluent treatment system 24 as polymer fluff 28.

The non-polymer components 26 may be processed, for example, by a fractionation system 30, to remove undesirable light and heavy components and produce fractionated product streams 32. The fractionated product streams 32 may then be returned to the reactor system 20 via the feed system 16. In addition, some or all of the non-polymer components 26 may bypass the fractionation system 30 to be recycled more directly to the feed system 16 as non-fractionated product streams 34. Additionally, in some embodiments, the fractionation system 30 may perform fractionation of the feedstocks 14 before introduction into the feed system 16, such that any one or combination of polymerization components may be controllably fed into the reactor system 20. For example, the fractionation system 30 may separate monomer components from diluent components to allow monomer and diluent components to be fed separately into the reactor system 20.

The polymer fluff 28 may be further processed within the effluent treatment system 24 and/or in an extrusion/loadout system 36. Although not illustrated, polymer granules and/or active residual catalyst in the effluent treatment system 24 may be returned to the reactor system 20 for further polymerization, such as in a different type of reactor or under different reaction conditions.

In the extrusion/loadout system 36, the polymer fluff 28 is typically extruded to produce polymer pellets 38 with the desired mechanical, physical, and melt characteristics. According to certain embodiments, extruder feed, including additives, such as UV inhibitors and peroxides, may be added to the polymer fluff 28 to impart desired characteristics to the extruded polymer pellets 38. An extruder/pelletizer within the extrusion/loadout system 36 receives the extruder feed, containing the polymer fluff 28 and whatever additives have been added. The extruder/pelletizer heats and melts the extruder feed, which then may be extruded (e.g., via a twin screw extruder) through a pelletizer die of the extrusion/loadout system 36 under pressure to form polyolefin pellets 38. The pellets 38 may be cooled in a water system disposed at or near the discharge of the extruder/pelletizer.

In general, the polyolefin pellets 38 may then be transported to a product load-out area where the pellets may be stored, blended with other pellets, and/or loaded into railcars, trucks, bags, and so forth, for distribution to customers 40. In the case of polyethylene, the polyolefin pellets 38 may include low density polyethylene (LDPE), linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex® polyethylene of Chevron-Phillips Chemical Company, LP, of The Woodlands, Tex., USA.

The polymerization and effluent treatment portions of the polyolefin manufacturing process 10 may be called the "wet end" 42 or "reaction side" of the process 10, while the extrusion/loadout portion of the polyolefin process 10 may be called the "dry end" 44 or "finishing side" of the polyolefin process 10.

The produced polyolefin (e.g., polyethylene) pellets 38 may be used in the manufacture of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Ultimately, the products and components formed from the polyolefin pellets 38 may be further processed and assembled for distribution and sale to the consumer. For example, a polyethylene milk bottle may be filled with milk for distribution to the consumer, or the fuel tank may be assembled into an automobile for distribution and sale to the consumer.

To form end-products or components from the polyolefin pellets 38, the polyolefin pellets 38 are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power, and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at subfreezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Polyolefin pellets 38, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of polyolefin pellet resins. The relatively thin gauge sheets are generally thermoformed into packaging applications such as drink cups, deli containers, produce trays, baby wipe containers and margarine tubs. Other markets for sheet extrusion of polyolefin include those that utilize relatively thick sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies provide the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, the polyolefin pellets 38 may also be supplied for the extrusion coating and lamination industry.

Figure 2:
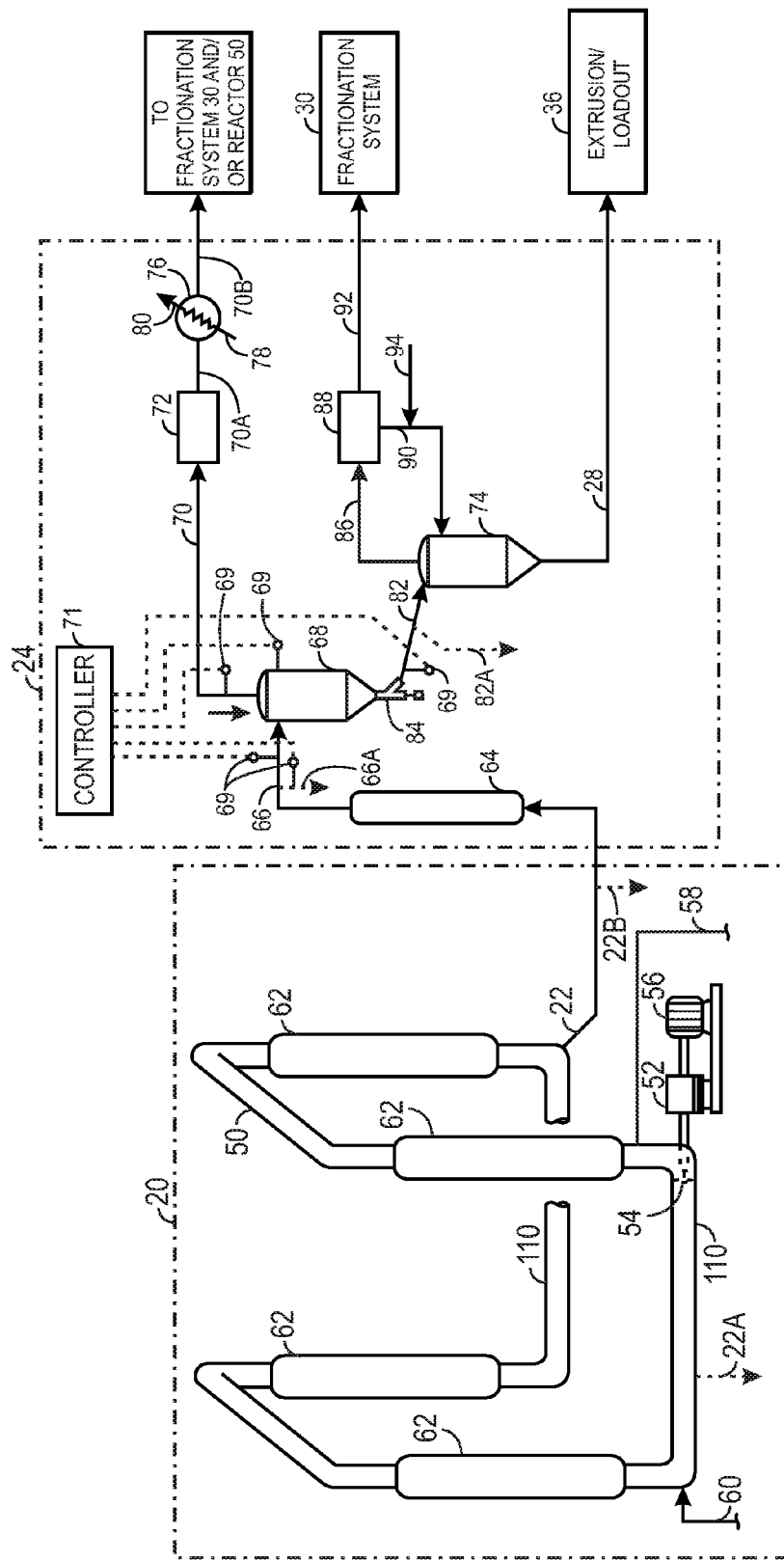
FIG. 2 is a schematic overview of a reactor system and effluent treatment system in accordance with an embodiment of the present techniques.

As mentioned, the above processes may be performed on a substantially continuous basis using one or more than one polymerization reactor arranged serially or in parallel. While the present approaches are applicable to a variety of different polymerization reactors having any number of configurations, a diagrammatical representation of one embodiment of the polymerization reactor system 20 (of FIG. 1) and the effluent treatment system 24 (also of FIG. 1) are depicted in FIG. 2. The reactor system 20 may produce a polyolefin particulate product, generically referred to as "fluff" herein. The reactor system 20 of FIG. 2 includes a liquid-phase polymerization reactor, i.e., a reactor in which polymerization processes are performed substantially in the liquid phase. Examples of such liquid phase reactors include autoclaves, boiling liquid-pool reactors, loop slurry reactors, and so forth. A loop slurry reactor 50 for producing polyethylene (and its copolymers) will be discussed to describe embodiments of the present techniques, though it is to be understood that the present techniques are similarly applicable to other types of liquid phase reactors.

The loop slurry reactor 50 generally includes segments of pipe connected by smooth bends or elbows. In some embodiments, the reactor 50 may be used to carry out polymerization of ethylene (and any co-monomers) under slurry conditions. Slurry conditions may include those in which insoluble particles of polyolefin, such as polyethylene or polypropylene are formed in a fluid medium (e.g., a hydrocarbon diluent) and are suspended as slurry until removed. A motive device, such as pump 52, circulates the fluid slurry in the reactor 50. An example of the pump 52 is an in-line axial flow pump with a pump impeller 54 disposed within the interior of the reactor 50. The impeller 54 may, during operation, create a turbulent mixing zone within a fluid medium circulating through the reactor 50 such that sufficient contact between different polymerization components within the slurry may occur. The impeller 54 may also assist in propelling the slurry through the closed loop of the reactor 50 at sufficient speed to keep solid particulates, such as the catalyst or polyolefin product, suspended within the fluid medium. The impeller 54 may be driven by a motor 56 or other motive force.

As mentioned, the fluid medium within the reactor 50 may include olefin monomers and comonomers, diluent, co-catalysts (e.g., triethylboron, methyl aluminoxane, alkyls such as triethylaluminum, etc.), molecular weight control agents (e.g., hydrogen), and any other desired co-reactants or additives. These components are added to the reactor interior via inlets or conduits at specified locations, such as depicted at feed stream 58, which generally corresponds to one of the feed streams 18 of FIG. 1. Likewise, a catalyst may be added to the reactor 50 via a conduit at a suitable location, such as a feed stream 60. A diluent carrier may also be included in the feed stream 60, which also generally corresponds to one of the feed streams 18 of FIG. 1. An example of a catalyst for polymerizing the ethylene monomer and comonomers which are present include a chromium oxide containing hexavalent chromium (or $Cr^{+2}$) on a silica support. In certain embodiments the chromium in the catalyst feedstock is received at the polyolefin facility as $Cr^{+3}$. In such embodiments, this catalyst may be subjected to a carbon monoxide (CO) activation process resulting in a valence change to $Cr^{+6}$ in the activated catalyst. Subsequently, during polymerization in the reactor, the $Cr^{+6}$ valence in the activated catalyst changes to $Cr^{+2}$ due to the presence of monomer (e.g., ethylene) and/or other contents within the reactor. Advantageously, the $Cr^{+2}$ sites in the catalyst are active for polymerization. However, it should be emphasized, as previously discussed, that a variety of catalyst systems other than chromium systems may be employed, such as metallocene catalysts, Ziegler Natta catalysts, and the like.

In total, the added components in the reactor generally define the fluid medium mentioned above that circulates within the reactor 50. However, it should be noted that the catalyst may be a suspended particle that forms, at least in part together with the fluid medium, the slurry that circulates through the reactor 50. The reaction conditions within the reactor 50, such as temperature, pressure, and reactant concentrations, are regulated to facilitate the desired properties and production rate of the polyolefin product, to control stability of the reactor, and the like. In some embodiments, the reaction temperature (the average temperature within the reactor 50) is maintained below a level at which the polymer product would go into solution. As indicated, due to the exothermic nature of the polymerization reaction, a cooling fluid may be circulated through jackets 62 around portions of the loop slurry reactor 50 to remove excess heat. In some embodiments, the temperature is substantially maintained within a desired range, such as between approximately 150° F. to 250° F. (65° C. to 121° C.). Likewise, a pressure within the reactor 50 may be regulated within a desired pressure range, such as from approximately 100 psig to 1200 psig (e.g., between approximately 200 psig and 950 psig, 300 psig and 825 psig, or 450 psig and 700 psig).

As the polymerization reaction proceeds within the reactor 50, the monomer (e.g., ethylene) and comonomers (e.g., 1-hexene) polymerize to form polyolefin (e.g., polyethylene) polymers. In some embodiments, the polyolefin polymers are substantially insoluble in the fluid medium at the regulated reaction temperature and pressure, which together with the catalyst on solid support form the slurry of solid particulates within the fluid medium. These solid polyolefin particulates may be removed from the reactor 50 via a settling leg or other feature or device, such as a continuous take-off, depicted as the discharge stream 22. Other take-offs may be disposed along the length of the reactor 50 or conduit that leads to the effluent treatment system 24. For example, during abnormal operation or if withdrawal of the contents within the reactor 50 is desired, some or all reactor contents may be withdrawn via take-offs 22A and 22B. In some situations, the withdrawn or dumped reactor contents may be sent to a knockout tank. In the dry end 44 (e.g., downstream processing area), the polyolefin discharged from the reactor 50 may be extracted from the slurry and purified.

To begin processing at the dry end 44, the discharge 22 from the reactor 50 may flow through an in-line flash heater, or flashline heater 64. The flashline heater 64 according to present embodiments may be configured to produce a stream of vapor and fluff 66 from the stream of liquid and fluff 22 that exits the reactor. The stream of vapor and fluff 66 may then be sent into a flash chamber 68 (i.e., a separation vessel). The stream of vapor and fluff 66 may generally include the fluff or solid portion, and the vaporized and non-vaporized liquid portion of the discharge stream 22. According to the present embodiments, in the stream of vapor and fluff 66, at least approximately 90% of the liquid from the discharge stream 22 has been vaporized. To aid in the volatilization of the liquid, the flashline heater 64 may include one or more surrounding conduits that use steam, steam condensate, hot oil, other heating media, electrical resistance heaters, or any combination thereof, for example, as a feature to provide indirect heating to the discharge 22. In present embodiments, the flashline heater 64 may be configured to allow more time than is sufficient for a liquid within the discharge stream 22 to vaporize (e.g., at least 2 seconds more), as is discussed below.

When the flashline heater has such a configuration, the probability that the fluff within the stream of vapor and fluff 66 may be substantially free of any entrained liquids (e.g., diluent, monomer) is increased. Depending on the particular configuration of the flashline heater 64 in accordance with present embodiments, the stream of vapor and fluff 66 may have a temperature difference between the fluff and vapor of less than approximately 20° F., 15° F., 10° F., 5° F., or 1° F. For example, in embodiments where the flashline heater 64 has a length such that the stream of vapor and fluff 66 has a residence time of greater than approximately 8 seconds, the difference in temperature may be less than approximately 5° F. In embodiments in which the stream of vapor and fluff 66 is allowed to reach a thermal equilibrium, the temperature difference may be less than approximately 1° F. Indeed, as defined herein, thermal equilibrium is intended to denote a temperature difference between the vapor, fluff, and entrained liquids (i.e., the phases of the stream 66) of less than approximately 1° F. as measured at the exit of the flashline heater 64. As is discussed below, such a temperature difference may be measured using one or more thermocouples disposed proximate the outlet of the flashline heater 64, at the overhead of the flash chamber 68, at the solids discharge of the flash chamber 68, within the flash chamber 68, or any combination thereof.

It is believed that increased residence times (e.g., greater than 8, 9, or 10 seconds) of the stream of vapor and fluff 66 within the flashline heater 64 may beneficially allow the fluff, vapor, and any entrained liquids to reach the thermal equilibrium. For example, while most (e.g. about 60% to 70%) liquid in the discharge 22 may readily vaporize, such as within the first one or two seconds within the flashline heater 64, some liquids such as diluent and/or liquid monomer may be attracted to and/or associated with the fluff. Such liquid may not vaporize as easily as liquid that is not associated with the fluff. That is, in operation of a conventional flashline heater, some liquid may remain entrained within the polymer fluff when the fluff exits the conventional flashline. While not wishing to be bound by theory, it is believed that the attraction of diluent to polymer fluff, as well as the diffusion resistance of the diluent from within the polymer fluff to the main stream of slurry flow, may slow the removal of diluent from the polymer fluff to the vapor phase. To mitigate such interactions, the flashline heater 64 according to present embodiments may be designed to allow sufficient driving force and time for most diluent, such as approximately 98%, 99%, or 99.5% of the diluent, to vaporize away from the fluff. Therefore, the stream of vapor and fluff 66 may include vapor that is substantially separated from the fluff. Indeed, as temperature equilibration (i.e. a temperature difference of less than approximately 1° F.) is attained within the flashline heater 64, the stream of vapor and fluff 66 may be substantially free of liquid contents, or may reach a sufficient diluent and/or liquid monomer volatilization temperature prior to its introduction into the flash chamber 68. As discussed below, the particular amount of volatilized liquid within the stream of vapor and fluff 66 may depend on the length and internal diameter of the flashline heater 64, as well as the velocity of the stream within the flashline heater 64. Moreover, the residence time of the stream within the flashline heater 64 that is suitable for attaining temperature equilibrium may also depend at least on some or all of these factors.

In embodiments where the reactor 50 experiences abnormal operating conditions, or should testing be desired on the stream of vapor and fluff 66, a portion of the stream may be withdrawn. For example, a take-off 66A may remove a portion of the stream 66 before reaching the flash chamber 68. Indeed, in certain embodiments, the temperature of the stream 66 that is removed at take-off 66A may be monitored to determine a temperature difference between the phases of the stream 66. Thus, the take-off 66A, in combination with certain temperature monitoring features such as a thermocouple, may aid in determining whether the stream of vapor and fluff 66 has reached a thermal equilibrium.

As noted above, in the flash chamber 68, most of the non-solid components of the reactor discharge 22 are withdrawn overhead as vapor in a flash gas 70. For example, in some embodiments, an additional portion of liquid that may not have been vaporized within the flashline heater 64 may be vaporized in the flash chamber 68. Indeed, in certain of these embodiments, any remaining liquid within the stream of vapor and fluff 66 may be volatilized within the flash chamber 68. In some configurations, to remove the flash gas 70 from the solids, the stream of vapor and fluff 66 may be heated to a temperature that is within 90% of the melting temperature of the solids, equal to the melting temperature of the solids, or above the melting temperature of the solids within the flash chamber 68 to produce the flash gas 70. In some configurations, a level or volume of fluff may be maintained in the flash chamber 68 to give additional residence time of the fluff in the chamber 68 to facilitate separation of liquid and vapor entrained in the porous fluff particles. However, according to the present technique, the flashline heater 64 may be configured such that the vapor is substantially separated from the fluff. Indeed, in some embodiments, such as when temperature equilibrium is attained within the flashline heater 64, a substantial portion of the flash gas 70 (e.g., 98%, 99%, or 99.5% of the total overhead discharge from the flash chamber 68) may be generated within the flashline heater 64.

As noted above, to determine whether temperature equilibration has occurred, the temperature of the stream of vapor and fluff 66 may be monitored at take-off 66A. Alternatively or additionally, temperature equilibration may be determined by monitoring the temperature at any one or a combination of the outlet of the flashline heater 64, the inlet of the flash chamber 68, the overhead discharge of the flash chamber 68, or the solids discharge of the flash chamber 68. Some or all of these temperatures may be monitored using temperature monitoring features known in the art, for example using thermocouples 69 as illustrated. The thermocouples 69, as illustrated, are disposed along the discharge conduits from the flash chamber 68 or along the flash chamber 68. A controller 71 may monitor any one or a combination of these temperatures and perform suitable adjustments to the system 24 as appropriate. For example, the controller 71 may determine a temperature difference between temperatures measured at one of the thermocouples 69 disposed at the overhead of the flash chamber 68 (i.e., the temperature of the flash gas 70), and another one of the thermocouples 69 disposed at the lower solids discharge portion of the flash chamber (i.e., the temperature of the solids). Again, in accordance with the present embodiments, such a temperature difference is less than approximately 20° F., such as between approximately 0 and 10° F. In embodiments in which the thermal equilibrium is reached, the temperature difference is less than approximately 1° F.

The controller 71 may be a distributed control system or similar feature that is in communication with any or a combination of the thermocouples 69, flow control valves for controlling the flow of heating fluid, other sources of heat (e.g., resistive coils), and flow control valves for adjusting the flow of the stream of vapor and fluff 66. To achieve and/or approach thermal equilibrium at a desired temperature, the controller 71 may adjust the amount of heat provided to the stream of vapor and fluff 66 within the flashline heater 64, the residence time of the stream 66 within the flashline heater 64 and/or the flash chamber 68, or a combination. In certain embodiments, the residence time of the stream 66 within the flash chamber 68 may depend at least partially on the measured temperature of the fluff, vapor, and/or liquid, as well as the pressure and composition of the flash gas 70. Moreover, while the present embodiments are discussed in the context of monitoring actual temperatures, the present embodiments are also applicable to approximated temperatures obtained by modeling or any other suitable method for indirectly obtaining a temperature or temperature estimate.

Additionally, some or all of these factors may also affect how the flash gas 70 is treated prior to recycle to the reactor 50. Therefore, the flash gas 70 may be sent to the fractionation system 30, or may bypass the fractionation system 30 in route to the reactor 50 (i.e., via the feed system 16). In embodiments where the flash gas 70 is not sent to the fractionation system 30, the recycled flash gas 70 may be at least a part of the non-fractionated stream 34 of FIG. 1. In other embodiments, such as when catalyst poisons have been added to the reactor discharge, the flash gas 70 may contain certain water or other residual catalyst poisons, and may be sent to the fractionation system 30. In polyethylene production, the flash gas 70 is primarily diluent, such as isobutane, or other diluents as noted above. The vapor may also contain most of the unreacted monomer (e.g., ethylene) and other light components, as well as unreacted comonomer (e.g., 1-hexene, butene, 1-pentene, 1-octene, and 1-decene) and other heavy components (e.g., hexane and oligomers). In general, light components or "lights" may be defined at those light components with lower boiling points than the diluent employed. In contrast, heavy components or "heavies" may be defined as those components having higher boiling points than the diluent. In one embodiment, the flash gas 70 may contain about 94 wt. % diluent, about 5 wt. % monomer, and about 1 wt. % other components.

The flash gas 70 may be processed in solids-removal equipment 72, which may include cyclones, bag filters, and the like, where entrained fluff solids (e.g., typically fine particles or fines) are removed and returned to the flash chamber 68 or to downstream equipment, such as the purge column 74 discussed below. The flash gas 70 may also travel through a deoxygenation bed, for example. Furthermore, the flash gas 70 may be cooled or condensed in a heat exchanger 76 (e.g., shell-and-tube construction) prior to its recycle to the feed system 16 or fractionation system 30. To reduce size and costs of the fractionation system 30, a portion of the flash gas 70, treated flash gas 70A, and/or condensed flash gas 70B may bypass the fractionation system 30 and return more directly (e.g., via line 34 of FIG. 1) to the reactor 50 via the feed system 16, as noted above.

The heat exchanger 76 may have a coolant supply 78 and a coolant return 80. The coolant employed may be cooling tower water, for example. In some situations, the size of the heat exchanger 76 (condenser) may be increased to accommodate the additional mass of diluent and monomer discharged from the reactor 50 (for example when reactor contents are withdrawn due to abnormal operation) to the flash chamber 68. While the flash gas 70 is condensed and/or recycled, the solids (e.g., polymer fluff) in the flash chamber 68 are withdrawn and sent to the purge column 74 via a conduit 82 for the solids discharge. The flash chamber 68 may be fitted with a take off (CTO) feature 84 that allows the solids discharge to be withdrawn substantially continuously, provided there is sufficient pressure to allow its removal. As an example, the CTO feature 84 may include a ram valve that opens to the conduit 82. When the ram valve of the CTO feature 84 is open, the solids discharge may substantially continuously flow into the conduit 82. However, in situations where there is insufficient pressure within the flash chamber 68, the ram valve may close. The conduit 82 may also include valve configurations that allow polymer to flow downstream while reducing the potential for vapor to flow between the purge column 74 and the flash chamber 68. For example, one or more ball valves, vee port ball valves, rotary valves, and/or cycling valves may be disposed on the conduit 82 for the solids discharge.

In addition to transferring the discharge, the conduit 82 may also include features for heating the solids discharge, such as one or more segments that include surrounding conduits or the like to facilitate heat exchange with a heated medium (e.g., steam and/or steam condensate) in a manner similar to the flashline heater 64. In some embodiments, the conduit 82 may indeed be a flashline heater. In such embodiments, the conduit 82 may heat the solids discharge to provide additional enthalpy to the solids to facilitate extrusion. As an example, the conduit 82 may heat the solids discharge to within at least about 50, 25, 5 or 1° F. of the initial melting temperature of the polymer fluff. In embodiments of polyethylene production and extrusion, the conduit 82 may heat the solids to between about 140° F. and 240° F. (e.g., about 200° F., relative enthalpy of 96 BTU/lb), wherein the temperature of the polyethylene at an outlet of the extruder is between about 260° F. and 360° F. (e.g., about 205° F., relative enthalpy of 270 BTU/lb).

In some situations, it may be desirable to remove at least a portion of the solids discharge, such as to perform quality control testing, temperature monitoring, or during abnormal operation, and so on. Accordingly, a portion of the solids discharge may be withdrawn via take-off 82A or take-off 22A. Furthermore, a relatively small fluff chamber may also be disposed on the conduit 82. Traditionally, the fluff solids from the flash chamber 68 is discharged into a lower pressure flash chamber, with the lower pressure flash gas requiring compression for recycle to fractionation system 30 and the reactor 50. However, using the flashline heater 64 according to the present technique, in addition to or in lieu of the implementation of one or more heating segments within the conduit 82, elimination of a low-pressure flash and the associated compression provides for discharge of the fluff solids from the flash chamber 68 directly to the purge column 74.

The primary solids feed to the purge column 74 may be the solids discharge (polyolefin fluff) from the conduit 82 that exits the flash chamber 68. According to the present embodiments, the solids discharge may be heated to within a few degrees of the temperature where the majority of the fluff melts, such as to within about 50° F., 25° F., 5° F. or 1° F. of the melting temperature of the fluff prior to extrusion. Indeed, this heating may reduce the energy used to perform the extrusion within the extrusion/loadout 36. In some configurations, the purge column 74 removes residual hydrocarbon (e.g., volatilized diluent and/or residual monomer) from the entering solids streams and provides substantially clean and/or dry polymer fluff 28. The fluff 28 may be transported or conveyed to the extrusion/loadout system 36 for conversion to pellets 38, and for distribution and sale as polyolefin pellet resin to customers 40. In general, the treated polymer particles discharged from purge column 74 as polymer fluff 28 may be processed in a conventional finishing operation, such as a screw extruder, in the extrusion/load out system 36 (FIG. 1).

To remove residual hydrocarbons, a stripping gas (e.g., nitrogen or other suitable inert gas) is circulated through purge column 74 to entrain and remove the hydrocarbons via overhead discharge 86. This discharge 86 may be sent through a separation unit 88, such as a membrane recovery unit, pressure swing adsorption unit, refrigeration unit, and so forth, to recover the stripping gas via stream 90, and to discharge a separated hydrocarbon stream 92. In the art, in embodiments where the stripping gas is nitrogen, the separation unit 88 may be known as an Isobutane Nitrogen Recovery Unit (INRU). Moreover, fresh nitrogen 94 may be added to the nitrogen stream 90 to account for nitrogen losses in the purge column 74 or separation unit 88. Finally, it should be noted that the hydrocarbon stream 92 may beneficially provide recycle feed to the fractionation system 30 or feed system 16 for direct recycle to the reactor 20. For example, the hydrocarbon stream 92 discharging from the separation unit 88 makes available hydrocarbon feed that may be processed to give the olefin-free diluent used for catalyst preparation.

Regardless of its exact configuration, it should be noted that a significant portion of the effluent treatment system 24 is directed towards treating the stream of vapor and fluff 66 that enters the flash chamber 68, for example to remove residual hydrocarbon diluent and/or monomer/comonomer from the polymer fluff. Accordingly, it is now recognized that the reduction or substantial elimination of such processes and equipment may increase efficiency in the operation of polymer production systems, such as the system 10. In other words, the flashline heater 64 and/or conduit 82 may obviate the need for some downstream processes that are configured to separate liquid portions of the discharge stream 22 from solid portions of the discharge stream 22, as substantially all of the liquid of the discharge stream 22 has been vaporized within the flashline heater 64. In this way, some processes, equipment, energy requirements, and processing time may be eliminated, which may reduce the overall costs and time associated with the production of substantially dry polymer fluff.

To accomplish such reductions or elimination, in addition to other advantages, the present embodiments provide for an increase in the time that the reactor discharge spends within the flashline heater 64, as noted above. For example, in a conventional configuration, a slurry discharged from a polymerization reactor may be heated or remain within a flashline heater for between approximately 5 and 8 seconds. It is now recognized that much of this time (e.g., at least approximately 80% of the time) may be spent in an area of relatively high pressure. Thus, for much of the time the slurry spends within the conventional flashline heater, the driving force for separating a liquid portion of the slurry from a solid portion of the slurry is relatively low. While not wishing to be bound by theory, it is believed that in order for the fluff to be substantially free of liquid, the slurry may generally undergo two volatilization processes: first, a vaporization of the liquids not associated with the fluff and second, a vaporization of liquids entrained within the fluff.

In conventional arrangements, only the first vaporization step may be substantially completed within the flashline heater. As an example, in a typical configuration, only about 70% of total hydrocarbon diluent may be volatilized within the flashline heater. Other features of the effluent treatment system 24, such as those described above, must therefore complete the second volatilization step. Indeed, in the present applicant's previous disclosure in U.S. Pat. No. 5,183,866, which is incorporated by reference herein in its entirety, the applicant failed to consider that the second volatilization step contributes to the overall removal of diluent from the fluff. That is, the applicant failed to recognize that liquids entrained within the fluff may require additional residence time within the flashline heater 64 and/or flash chamber 68 and/or additional heat provided to the discharge stream 22 to attain a second volatilization that volatilizes liquid entrained in the fluff. Accordingly, the present embodiments provide for the flashline heater 64 to substantially complete both volatilization steps, to, for example, volatilize at least about 75%, 90%, 95%, 99%, 99.5% or more of the residual hydrocarbon diluent and/or monomer. In some embodiments, the flashline heater 64 is configured to heat the discharge stream 22 such that any liquid remaining in the stream of vapor and fluff 66 at the end of the flashline heater is at a temperature that at least approaches the temperature suitable for vaporizing hydrocarbons at the pressure in flash chamber 68. For example, the temperature of the remaining liquid may be about 20° F., 15° F., 10° F., 5° F., or 1° F. lower, or substantially equal to, the temperature suitable for such vaporization. In accordance with certain of the present embodiments, the stream of vapor and fluff 66 may reach a temperature equilibrium at a temperature substantially equal to, approximately 1° F. lower than, or within approximately 5° F. of, the volatilization temperature of the liquid (e.g., diluent). That is, the temperatures of the vapor, fluff, and any liquid may be within approximately 1° F. of the volatilization temperature of the diluent.

The process associated with the two vaporization steps introduced above is discussed below within the context of a flashline heater to provide a better understanding of the present embodiments. As noted above, in general, as the slurry progresses through the flashline heater, the liquid components become volatilized, generating a vapor component in addition to the solid and liquid components of the discharged slurry. After a certain amount of time, most (e.g., about 60 to 70%) or nearly the entire liquid portion of the slurry that is not contained within the porous polymer fluff becomes vaporized. That is, a first portion of the liquid of the discharge 22 becomes vapor in the first volatilization process. Subsequent to this, in the second volatilization process, liquid (e.g., diluent, monomer, co-monomer) that is contained (i.e., entrained and/or absorbed) within the porous polymer fluff begins to volatilize. That is, a second portion of the liquid of the discharge 22 begins to volatilize.

Conventional configurations may fail to substantially complete the volatilization of the liquid associated with the porous polymer fluff (the second portion) due, at least in part, to the removal energy from the liquid's surrounding environment upon volatilization. Such energy removal by volatilizing the second portion of the liquid results in a cooling of the polymer fluff, which may impede the ability of any remaining liquid within the porous polymer fluff to vaporize. Therefore, in some configurations, such as conventional flashline heaters having an average length (e.g., approximately 400 feet and below) and average internal diameter (e.g., approximately 4 inches and below), the stream of vapor and fluff 66 may contain unvolatilized liquids. It is now recognized that diameters and/or lengths of the flashline heater 64 may be increased over those of conventional designs to allow more time than is sufficient for volatilization of the first portion and a substantial portion (e.g., at least about 90%, 95%, 99%, or 99.5%) of the second portion of liquid within the slurry. To accomplish such volatilization, in certain of the present embodiments, the residence time of the discharge within the flashline heater 64 is at least approximately 8 seconds, such as approximately 8.5, 9, 9.5, 10, 10.5, 11, 11.5 seconds or more. Such a configuration may result in the first portion of liquid being volatilized between approximately 1 and 6 seconds prior to the stream 66 exiting the flashline heater 64. For example, the first portion may volatilize at least approximately 1, 1.5, 2, 2.5, 3, 3.5, or 4 seconds or longer prior to the stream 66 exiting the flashline heater 64. In some embodiments, the flashline heater 64 may have a length greater than about 400 feet and/or an internal diameter of greater than about 4 inches. Further, as discussed in detail below, it may be desirable to control the heating temperature through some or through the entire flashline heater 64. Therefore, the flashline heater 64 may also include one or more sections of variable temperature. It should be noted, however, that the particular configuration of the flashline heater 64 in accordance with present embodiments may depend at least partially on the velocity of the stream of vapor and fluff 66 within the flashline heater 64, the composition of the stream 66, and the desired final temperature, among other considerations.

As noted above, the length, diameter, temperature, and/or pressure of the flashline heater 64 may be manipulated according to present embodiments. In one embodiment, the flashline heater 64 may have a "short" length with a "large" diameter (e.g., a length of approximately 400 ft or lower with a diameter above approximately 4 inches). In another embodiment, the flashline heater 64 may have a "long" length with a "small" diameter (e.g., a length of greater than approximately 400 ft with a diameter of approximately 4 inches or lower). In a further embodiment, the flashline heater 64 may have a "long" length with a "large" diameter (e.g., a length of greater than approximately 400 ft and a diameter of greater than approximately 4 inches). Examples of such ranges are provided hereinbelow. While certain dimensions are referenced above and discussed in further detail below with respect to specific examples, it should be noted that such dimensions may depend on the amount of polymer and diluent produced in a given implementation. Furthermore, while the length/diameter of the flashline heater 64 may influence the travel time of discharged materials through the flashline heater 64, such travel time may also be influenced by the velocity of the fluff, which may be maintained at a level sufficient to pneumatically transport the fluff. In certain presently contemplated embodiments, the total travel time of the discharged materials through the flashline heater 64 may be approximately 8 seconds, 8.5 seconds, 9 seconds, 9.5 seconds, 10 seconds, 11 seconds, 12 seconds, or more.

Figure 3:
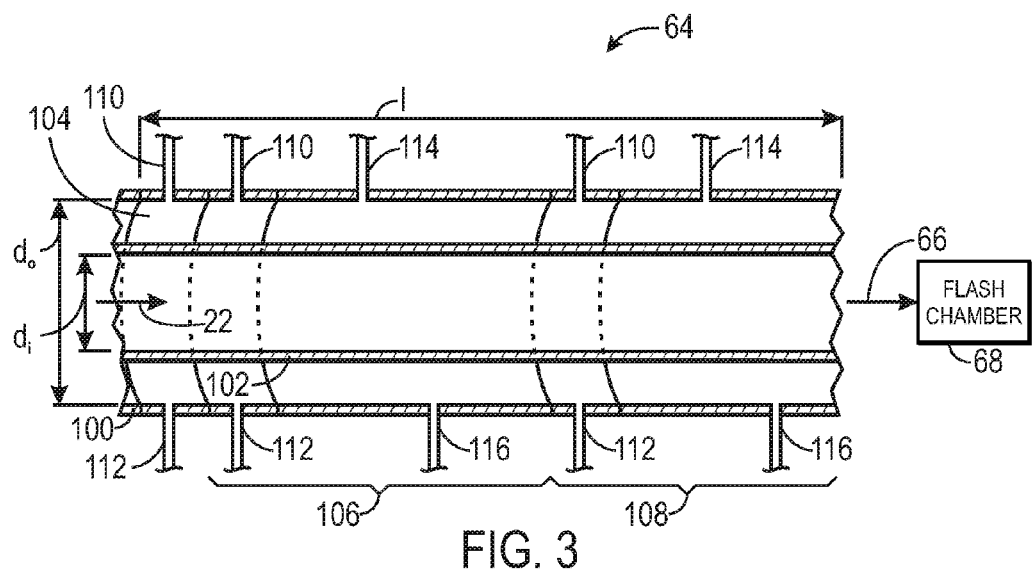
FIG. 3 is a schematic view of a flashline heater configured to separate portions of a slurry withdrawn from the reactor of FIG. 2, in accordance with an embodiment of the present techniques.
Figure 4:
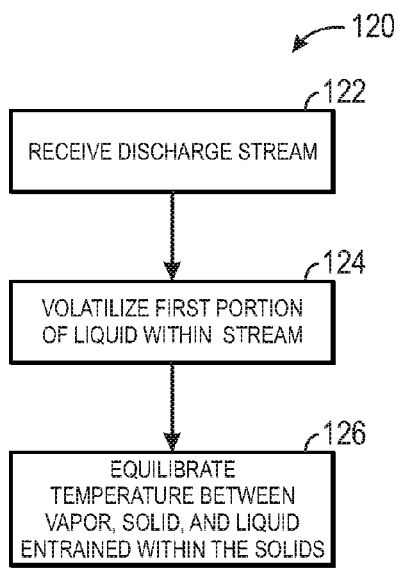
FIG. 4 is a block flow diagram of an embodiment of a flashline heater operational method in accordance with the present techniques.

To further illustrate the dimensions of the flashline heater 64 and their relation, FIG. 3 is cross-sectional view of an embodiment of the flashline heater 64 according to an aspect of the present technique. Furthermore, it should be noted that the embodiments described hereinbelow may also provide a general description of conduit 82 and the manner in which it may treat the solids discharge exiting the flash chamber 68. As mentioned, the flashline heater 64 is generally sized and configured to receive a slurry discharge 22 from the reactor 50 and vaporize substantially all of the first portion of the liquid (i.e., the portion not entrained within the polymer fluff) present in the discharge 22 and a majority of the second portion of the liquid (i.e., the portion entrained within the polymer fluff) prior to delivery to the flash chamber 68. Generally, as noted above, the flashline heater 64 is configured such that the travel time of the polymer fluff through the flashline heater 64 is at least approximately 8 seconds. As the discharge 22 progresses through the flashline heater 64, the temperature of its various components may approach equilibration. For example, the temperature between the vaporized first portion of the liquid, the polymer fluff, and the second portion of the liquid may become substantially equilibrated or have a temperature difference of less than approximately 10° F. In certain embodiments, such as those where the flashline heater 64 has a long length and large diameter, the flashline heater 64 may also vaporize a substantial amount (e.g., at least about 75%, 90%, 95%, 99%, 99.5% or more) of the second portion of the liquid. Therefore, the characteristics of the stream of vapor and fluff 66 delivered to the flash chamber 68 may depend on many factors including but not limited to a length "l" of the flashline heater 64, a diameter "$d_o$" of an outer conduit 100 of the flashline heater 64, an internal diameter "$d_i$" of an inner conduit 102 of the flashline heater 64, the design velocity of the flashline heater 64 in relation to the take-off velocity of the discharge 22, the chemical nature of the components within the discharge 22, and so forth.

To affect the volatilization of the liquid within the discharge stream 22, in addition to the non-traditional length and diameter dimensions, the flashline heater 64 may also include a plurality of segments 104 forming the outer conduit 100. The segments 104 may be configured to facilitate a flow of a warming medium through a portion or the entire outer conduit 100. The segments 104 may have the same or differing diameters and/or lengths. For example, the segments 104 may have outer diameters between approximately 4 and 8 inches (e.g., approximately 4 inches, 5 inches, 6 inches, 7 inches, or 8 inches). Further, the segments 104 may have a length that is between approximately 5 feet and approximately 100 feet (e.g., approximately 10 feet, 15 feet, 20 feet, 40 feet or 100 feet), although the length of each segment 104 may depend on the particular number of segments 104 employed and the overall length of the flashline heater 64 in a given implementation.

The warming medium that flows through the segments 104 may allow the flashline heater 64 to heat the discharge stream 22 throughout the entire length l of the flashline heater 64 or only certain sections of the flashline heater 64. That is, the flashline heater 64 may increase, decrease, or maintain the temperature of the discharge stream 22 as it encounters the plurality of segments 104, which may allow for control of the heating rate and/or resulting temperature of the fluff as the stream of vapor and fluff 66 exits the flashline 64. During operation, the warming medium may flow through one or more segments 104 of the outer conduit 100, which indirectly heats the discharge stream 22 as the discharge stream 22 flows through the inner conduit 102. In other words, the warming medium flowing through one segment 104 may be substantially separated from the warming medium flowing through another segment 104, such that each segment 104 may be separated from the other. Alternatively or additionally, two or more segments 104 may share a flow of warming medium. For example, the two or more segments 104 may share a single inlet and outlet. In some embodiments, the warming medium may be warmed coolant from the cooling jackets 62, steam or steam condensate, hot oil, or another heating source such as heat generated by electrical resistance heaters.

In the illustrated embodiment, the flashline heater 64 allows warming medium to flow through any one or a combination of the segments 104. For example, the heating medium may flow through a first set of segments 106 but not through a second set of segments 108, or any similar flow or temperature scheme, such as through every third segment, or through three segments and not through a fourth, and so on. For example, in the illustrated embodiment, the warming medium may flow into a respective inlet 110 and out of a respective outlet 112 of one of the segments 104. As illustrated, each segment 104 may have its own respective inlet 110 and/or outlet 112, or combinations of segments 104 may have a common inlet 114 and/or a common outlet 114, as noted above. Specifically, the first set of segments 106 and second set of segments 108 are depicted as having at least one segment 104 having the inlet 110 and outlet 112, and a group of segments 104 having the common inlet 112 and common outlet 114. In one implementation, when the warming medium flows through the first set of segments 106 but not the second set 108, it may initially warm the discharge stream 22 such that substantially all of the liquid within the stream 22 has been vaporized, followed by a period of cooling or temperature maintenance. Whether the second set of segments 108 is used to provide heat may depend on the measured levels of diluent entrained within the fluff, the desired specifications of the fluff, desired fluff temperature, and so forth. However, it should be noted that, in embodiments where the flashline heater 64 is configured to substantially continuously heat the discharge stream 22 along a length of greater than about 700 feet, the fluff may begin to melt, which may cause difficulty in further processing. By controlling the amount of warming fluid flowing through each segment 104 or combination of segment sets 106, 108, an operator and/or controller may be able to adjust the temperature of the stream of vapor and fluff 66 to a desired level. In one embodiment, the temperature difference between the vapor and solids (fluff) exiting the flashline heater 64 may be substantially negligible or the temperature of the fluff may approach about within 40° F., 20° F., 10° F., 5° F., or 1° F. of the temperature of the vapor, as noted above. Further, the vapor and fluff 66 may approach a thermal equilibrium, such that substantially all of the liquid entrained in the fluff, the vapor and the fluff each have a temperature that differ from one another by no more than 1° F.

In addition to or in lieu of the temperature control scheme described above, the volatilization and/or thermal equilibration may at least partially depend on the length l of the flashline heater 64. For example, the length l of the flashline heater 64 may at least partially determine the temperature of the stream of vapor and fluff 66 as well as the extent of entrained liquid remaining within the fluff. In a general sense, the length l of the flashline heater 64 at least partially determines how much time the discharge stream 22 spends in heated areas, in cooled areas, in areas of high and/or low pressure, and so on. In this way, the length l of the flashline heater 64 may at least partially determine the amount of time between full vaporization of liquids not associated or entrained within the fluff of the discharge 22 and the delivery of the stream of vapor and fluff 66 to the flash chamber 68. Therefore, it should be noted that in some configurations, such as those with a substantially constant diameter and temperature, that as the length l of the flashline heater 64 increases, so may the transit time of the discharge stream 22 through the flashline heater 64 and the likelihood that the second portion of liquid has been substantially volatilized.

While the length l of the flashline heater 64 may at least partially determine the transit time of the discharge 22, the diameters $d_i$ and $d_o$ may at least partially determine the rate at which the liquids within the discharge 22 volatilize. Therefore, the length l and diameters $d_i$ and $d_o$ of the flashline heater 64 may have a synergistic effect in determining the characteristics of the stream of vapor and fluff 66 delivered to the flash chamber 68. Therefore, it should be noted that an increase in both the length l and the internal diameter $d_i$ relative to conventional dimensions may greatly increase the probability of full vaporization of liquids and/or temperature equilibration between the vapor, liquids, and fluff.

Further, while the length l of the flashline heater 64 may be fixed (i.e., the flashline heater 64 only has one length), it should be noted that the diameter $d_i$ may change along the length of the flashline heater 64. Therefore, the discharge stream 22 may experience changing pressure proportional to the diameter change as it progresses through the flashline heater 64. Temperature and/or pressure changes may be substantially static (e.g., unchanging throughout the length l of the flashline in time) or may be dynamic (e.g., changing throughout the length l of the flashline in time). That is, the segments 104 may have different or the same heating temperatures, different or the same pressures, or any combination of these. In either case, be it static or dynamic, as noted above, the first portion of the liquid of the discharge stream 22 (the portion not entrained within the polymer fluff) may be substantially totally volatilized with sufficient remaining transit time to allow the second portion to substantially volatilize (e.g., at least about 75%, 90%, 95%, 99%, or 99.5% of the second portion of liquid is volatilized), or at least to reach a thermal equilibrium with the polymer fluff and vapor within the stream of vapor and fluff 66 exiting the flashline heater 64. Again, when the phases of the stream of vapor and fluff 66 have reached thermal equilibrium, the phases will differ in temperature by no more than approximately 1° F.

To reach substantial vaporization and/or thermal equilibrium, in accordance with present embodiments, the discharge stream 22 flows through the flashline 64 through the inner conduit 102 having the internal diameter $d_i$. Substantially concurrently, the discharge stream 22 is heated by a warming fluid within the outer conduit 100 having the diameter $d_o$, which surrounds the inner conduit 102. According to the present approaches, either or both of these diameters may impact the rate at which liquids within the discharge stream 22 volatilize. For example, in some embodiments, the inner diameter $d_i$ may be inversely proportional to the pressure within the flashline 64. That is, as the diameter $d_i$ increases, the pressure acting on the discharge stream 22 may decrease, which may allow an increased rate of volatilization of the liquids. Accordingly, in some embodiments, the internal diameter $d_i$ of the inner conduit 102 is increased relative to conventional designs, such as to diameters of at least 4, 5, or 6 inches, or more.

An increase in the diameter $d_o$ may also increase the rate of volatilization of the liquids within the discharge stream 22. For example, the diameter $d_o$ may define the amount of warming fluid available to the outer surface of the inner conduit 102 for indirectly heating the discharge stream 22. While the exchange of heat between the warming medium and the discharge stream 22 may be substantially limited by the outer and inner surface areas of the inner conduit 102, it should be noted that as the diameter $d_o$ of the outer conduit 100 increases, so may the amount of warming medium available for heat exchange. Accordingly, as the amount of warming medium within the outer conduit 100 increases, heat transfer to the discharge stream 22 may have a minimized impact on the average temperature of the warming medium within the outer conduit 100. Therefore, by increasing the diameter $d_o$ relative to diameter $d_i$, more efficient heating of the discharge stream 22, and therefore volatilization of the liquids within the discharge stream 22, may be realized.

It should be noted, in light of the present discussion, that the diameter $d_o$ of the outer conduit 100, the diameter $d_i$ of the inner conduit 102, the length l, and their interrelation may at least partially determine the relative times of phase changes that occur to the liquids of the discharge stream 22.

Further, as noted above, the segments 104 may include segments having warming fluid, segments without warming fluid, and so forth. Examples of such combinations and their effects on the discharge stream 22 are described below, including total time within the flashline heater and the time from entering the flashline heater to total vaporization, among others.

Tabulated below are calculated modeling data for three examples of the embodiments described above. It should be noted that the model used to generate the modeling data assumes thermal equilibrium between the vapor, liquid and solid phases. However, as noted above, a temperature difference between these phases may exist due to the energy that is primarily convectively conducted to the vapor phase.

in Tables 1-4 are calculated, modeled data for the flashline heater 64 as represented at each of its segments 104. The discussion below with respect to the discharge stream 22 and/or the stream of vapor and fluff 66 is presented in relation to the segments 104 of the flashline heater 64. That is, the discussion of a particular segment 104 may relate to the contents of the inner conduit 102 and/or the contents of the outer conduit 100 at the position of that segment 104. The contents of the conduits 100, 102 do not mix. The flow of the product stream through the inner conduit 102 of the flashline heater 64 is substantially continuous, while the flow of warming medium through the outer conduit 100 of the flashline heater 64 may be substantially continuous or discontinuous.

TABLE 1

REPORT LINE SEGMENT RESULTS, 400' × 6" Flashline Heater, Example 1

| SEG NO | LENGTH (ft) | OUTLET PRESS (PSIA) | PRESS DROP (PSI) | OVERALL Uo (BTU/h-ft2-° F.) | OUTLET WT FRACTION OF VAPOR | OUTLET TEMP (° F.) | AVERAGE VELOCITY (ft/sec) | DUTY (1000 BTU/h) | Time in FLH (sec) |
|---|---|---|---|---|---|---|---|---|---|
| 1 | 10 | 183.6 | 1.7 | 0 | 0.7334 | 156.4 | 44 | 0 | 0.23 |
| 2 | 20 | 181 | 2.6 | 90.2 | 0.7652 | 155.7 | 46.1 | 102.3 | 0.43 |
| 3 | 20 | 178.4 | 2.6 | 90 | 0.7973 | 155 | 48.4 | 103.6 | 0.41 |
| 4 | 20 | 175.8 | 2.61 | 89.9 | 0.8299 | 154.2 | 50.7 | 104.8 | 0.39 |
| 5 | 20 | 174 | 1.79 | 89.7 | 0.8601 | 153.7 | 52.8 | 105.7 | 0.38 |
| 6 | 10 | 173.4 | 0.62 | 0 | 0.8622 | 153.5 | 53.1 | 0 | 0.19 |
| 7 | 20 | 172.4 | 0.95 | 89.5 | 0.8898 | 153.3 | 54.8 | 106.6 | 0.36 |
| 8 | 20 | 171.5 | 0.95 | 89.5 | 0.9174 | 153.2 | 56.5 | 106.6 | 0.35 |
| 9 | 20 | 170.6 | 0.94 | 89.4 | 0.9451 | 153 | 58.3 | 106.9 | 0.34 |
| 10 | 20 | 169.6 | 0.92 | 89.3 | 0.9715 | 152.8 | 60 | 106.8 | 0.33 |
| 11 | 10 | 169.1 | 0.58 | 0 | 0.972 | 152.6 | 60.2 | 0 | 0.17 |
| 12 | 20 | 168.2 | 0.89 | 89.1 | 0.9978 | 152.4 | 62.1 | 104.5 | 0.32 |
| 13 | 20 | 167.3 | 0.84 | 89 | 1 | 154.9 | 63 | 102.3 | 0.32 |
| 14 | 20 | 166.5 | 0.79 | 89.2 | 1 | 157.5 | 63.9 | 97.9 | 0.31 |
| 15 | 20 | 165.8 | 0.79 | 89.5 | 1 | 160 | 64.8 | 93.6 | 0.31 |
| 16 | 10 | 165.2 | 0.53 | 0 | 1 | 159.9 | 65 | 0 | 0.15 |
| 17 | 20 | 164.4 | 0.79 | 89.7 | 1 | 162.3 | 65.9 | 89.5 | 0.3 |
| 18 | 20 | 163.6 | 0.8 | 90 | 1 | 164.5 | 66.8 | 85.6 | 0.3 |
| 19 | 20 | 162.8 | 0.8 | 90.2 | 1 | 166.7 | 67.6 | 81.8 | 0.3 |
| 20 | 20 | 162 | 0.8 | 90.4 | 1 | 168.7 | 68.4 | 78.1 | 0.29 |
| 21 | 10 | 161.5 | 0.54 | 0 | 1 | 168.7 | 68.7 | 0 | 0.15 |
| 22 | 20 | 160.7 | 0.81 | 90.6 | 1 | 170.6 | 69.5 | 74.7 | 0.29 |
| 23 | 20 | 159.9 | 0.81 | 90.8 | 1 | 172.4 | 70.3 | 71.4 | 0.28 |
| 24 | 20 | 159.1 | 0.81 | 91 | 1 | 174.2 | 71.1 | 68.2 | 0.28 |
| 25 | 20 | 158.3 | 0.81 | 91.2 | 1 | 175.9 | 71.9 | 65.2 | 0.28 |
| 26 | 10 | 157.3 | 0.99 | 0 | 1 | 175.8 | 72.4 | 0 | 0.14 |
| Total Time From Total Vaporization to End of FLH = 3.70 | | | | | | | | Total Duty (mmBTU/h) | Total Time (sec) |
| | | | | | | | | 1856.1 | 7.62 |

Subsequently, energy is conducted from the vapor phase to the solid and liquid phase (if present). Table 1 contains calculated modeling data for a flashline heater embodiment (e.g., the flashline heater 64 in FIG. 3) having a length of 400 feet and a diameter of 6 inches. This and the subsequent tables discussed below pass a typical slurry flow of 73,880 lbs/hr with 40068 lbs of polyethylene and 38,112 lbs of diluent, which is approximately 95 wt % isobutane and has an initial temperature of 227° F. Table 2 contains calculated modeling data for a flashline heater embodiment wherein the length is 700 feet and the diameter is 6 inches with heating throughout the length of the flashline heater. Table 3 contains calculated modeling data for a flashline heater embodiment similar to that calculated in Table 2, yet with heating throughout only a portion of the flashline heater, such as when the end portion 108 (FIG. 3) of the flashline heater 64 is not heated. Table 4 is a summary of the calculated data provided in Tables 1-3 for comparison. The data presented As noted above, Table 1 contains calculated data generated by a model of the flashline heater 64 (FIG. 3) wherein the length l is approximately 400 feet and the internal diameter $d_i$ of the inner conduit 102 is approximately 6 inches. In the modeled embodiment of Example 1, the flashline heater 64 includes 26 segments (e.g., segments 104 in FIG. 3), with each segment having a length of approximately 10 or 20 feet. Specifically, segments having no warming fluid in their outer conduit 100 (i.e., segments 104 that are not configured to heat the discharge stream 22) are approximately 10 feet long, and segments having warming fluid in their outer conduit 100 (i.e., segments 104 configured to heat the discharge stream 22) are 20 feet long. It should be noted that the segments that are 10 feet long may represent bends or elbows in the flashline heater 64. As such, those segments may not contribute to the calculated length l of the flashline heater 64. Further, in the embodiment represented by the calculated data in Table 1, every fifth segment is not warmed, or "turned off." Thus, during operation, it may be considered that as the discharge stream 22 enters the flashline heater 64, it is not heated by warming fluid for the first 10 feet (the first segment), then heated for 80 feet (segment nos. 2-5), then not heated for another 10 feet (for example, at a bend or elbow at segment number 6), and so on, until the stream of vapor and fluff 66 exits the flashline heater 64 after segment number 26.

While the amount of heat at each segment may be the same or different in Example 1, the internal diameter $d_i$ of each segment of the flashline heater 64 of Examples 1-3 may be substantially the same. In Tables 1-3, the data suggests that a pressure drop in the segments may correspond to an increase in vapor and a decrease in liquids of the discharge stream. As such, the calculated pressures in Table 1 decrease substantially continuously throughout the length of the flashline heater. In Examples 1-3, the pressure at each segment is represented by outlet pressure data, which is pressure data at the end of each segment, and pressure drop data, which is representative of the pressure difference between the beginning of each segment and the end of that respective segment. The outlet pressure and pressure drop is represented in absolute pounds per square inch (psia) and pounds per square inch (psi), respectively. The outlet pressure data may be useful in determining how the pressure of the discharge stream changes over time, and the pressure drop data may be useful in determining the work done (via change in pressure) at each segment as the discharge stream flows through.

For example, in Example 1 the outlet pressure of segment number 1 is 183.6 psia. In a configuration utilizing a polyethylene loop reactor, the pressure immediately upstream of the flashline heater 64, such as the pressure at a continuous take-off, may be approximately 600 psia. Therefore, it may be considered that as the discharge stream 22 leaves the reactor 50 (FIG. 2) and enters the flashline heater 64 of Example 1, it experiences a change in pressure from approximately 600 psia to approximately 183.6 psia at the outlet of segment number 1. As such, there may be a nearly immediate volatilization of a significant amount of the first portion of the liquid within the discharge stream, which is represented as the outlet weight fraction of vapor of each segment, as discussed below. Further, as the discharge stream flows through the first segment, its pressure changes by about 1.7 psi from the beginning of the first segment to the end of the first segment. It should be noted that the magnitude of the pressure drop and decrease in outlet pressure may be dependent on a number of factors, including the diameter of the flashline and the amount of slurry (diluent and polymer) passed through the flashline.

As noted above, in addition to the pressure drop experienced by the discharge stream 22, the energy (i.e., warming) provided to the discharge stream may facilitate volatilization of its liquid components. In the modeled embodiment of Example 1, segment number 1 is not configured to heat the discharge stream. In such an embodiment, there is little to no heat indirectly transferred from a warming medium within the outer conduit 100 to the discharge stream 22 within the inner conduit 102. As such, the calculated heat transfer coefficient, $U_o$, for the first segment (segment number 1) is 0. However, as the discharge stream progresses through segments that are configured to provide heat, the value of $U_o$ becomes a non-zero number, which in the embodiment of Example 1 ranges from approximately 80 BTU/hr-ft$^2$-° F. to approximately 92 BTU/hr-ft$^2$-° F. Additionally, as noted above, every fifth segment is turned off. Therefore, the calculated $U_o$ value at every fifth segment (i.e., segment numbers 1, 6, 11, 16, 21, and 26) is 0.

The total amount of liquid that has vaporized upon exiting each segment is represented in Tables 1-3 as the weight fraction of vapor with respect to the total amount of hydrocarbons (such as diluent, monomer and comonomer, and not including the polymer fluff), which may be a result of the outlet pressure of each segment, the pressure drop experienced at each segment, and the amount of heat transferred to the discharge stream (as measured by $U_o$) described above. It should be noted that the weight fraction calculation in Tables 1-3 represents all the diluent in the first and second vaporization step. That is, vaporization of the liquid that is entrained within the polymer fluff is accounted for in the weight fraction data. In Table 1, the entry corresponding to the outlet weight fraction of vapor for the first segment indicates that, upon exiting the first segment, the ratio of vaporized hydrocarbon to liquid hydrocarbon is about 0.7334, or, that about 73.34% of the hydrocarbons that are discharged from the reactor along with the polymer fluff. It can be appreciated from Table 1 that as the discharge stream flows through the flashline heater, the weight fraction of vapor continuously increases until substantially all of the hydrocarbons have been volatilized upon exiting segment number 13.

However, because of the short time in contact with the heating surface (as represented in Table 1) and since the vapor phase is the primary phase that initially receives heat, the solid polymer and any liquid absorbed and/or entrained in the fluff will have a temperature below that of the vapor phase. Therefore, a greater amount of liquid may remain with the fluff once the stream leaves the flashline heater 64 and enters the flash tank 68. In the flash tank 68, the majority of the vapor is separated from the fluff, and the entrained liquid in the fluff having a lower temperature than the vapor may cause the fluff to entrain more liquid than predicted by the calculations in Table 1 due to condensation. Thus, a greater amount of liquid may need to be removed in the purge column 74 using increased levels of the stripping gas mentioned above. This increased amount of stripping gas used in stream 86 may then be re-compressed and processed into stream 92. With regard to the example set forth in Table 1, such acts may represent an increased product cost.

It should be noted that the transition of the hydrocarbons from liquid to vapor phase may require energy, and that this energy may be extracted from the surrounding hydrocarbon environment. That is, as the hydrocarbons volatilize, they remove energy from their surroundings, resulting in a decrease in temperature of the discharge stream. In accordance with such a process, the calculated outlet temperature data presented in Table 1 indicates that the discharge stream has a temperature of about 156.4° F. upon exiting the first segment. The outlet temperature steadily decreases along with the increase in weight fraction of vapor, until the weight fraction of vapor reaches 1. That is, the temperature of the discharge stream steadily decreases until volatilization of substantially all of the hydrocarbons not entrained within the fluff has occurred. Thereafter, the temperature of the discharge stream (and/or the stream of vapor and fluff) begins to increase, which facilitates the vaporization of hydrocarbons entrained within the fluff.

As the amount of vapor within the flashline heater 64 increases, the average velocity of the discharge stream 22 through each segment 104 may substantially continuously increase. For example, the expansion from liquid to vapor as the liquid is volatilized may aid in motivating the discharge stream 22 through the flashline heater 64. In Example 1, as the discharge stream enters the beginning of the flashline heater 64, its average velocity is about 44 ft/sec. As the liquid within the discharge stream 22 vaporizes, the velocity of the discharge stream 22 increases until it exits the flashline heater 64 at segment number 26, at which point the discharge stream has an average velocity of approximately 72.4 ft/sec. As noted above, such velocities may facilitate the transfer of heat between the warming fluid and the stream.

The amount of warming medium provided to the heating segments (e.g., segment numbers 2-5 in Example 1) may be determined, at least in part, by the desired fluff temperature, the desired temperature of the discharge stream 22, the composition of the discharge stream 22, and so forth. For example, to achieve a substantially continuous target temperature or temperature range at each segment 104 (such as during continuous operation of a loop reactor), it may be desirable to replenish the warming medium within the heating segments to offset heat (energy) lost by transfer to the discharge stream 22. In embodiments where the warming medium is provided at a substantially constant temperature to the heating segments (i.e., the warming medium is always substantially the same temperature as it enters each segment), the rate of replenishment may also be substantially continuous at each segment. Therefore, the energy used (and work done) at each heating segment may be represented as warming medium duty. Accordingly, Table 1 also provides the warming medium duties at each heating segment, with the duties at each non-heating segment (every fifth segment) being 0. As the amount of vapor increases, less warming medium (energy) is required to reach a target temperature or temperature range at downstream portions of the flashline heater 64. Such a decrease in required energy is represented by a substantially continuous decrease in warming medium duty from segment number 2 to segment number 25. It should therefore be noted that the rapid volatilization of the liquid of the discharge stream 22 afforded by the flashline heater 64 compared to traditional configurations may result in a lower total duty suitable for volatilization of hydrocarbon liquids compared to the same.

As noted above, the average velocity of the discharge stream 22 or stream of vapor and fluff 66 as it flows through the flashline heater 64 gradually increases. As such, the time spent within each flashline segment may also decrease. In Example 1, the time from when given portion of the discharge stream enters the first segment to when the portion exits the first segment is about 0.23 seconds. As the heated segments that follow the first segment are about twice the length of the first segment, the discharge stream spends about twice the amount of time within each heated segment, which in the first four heated segments of Example 1 ranges between about 0.38 seconds and about 0.43 seconds. As the velocity of the discharge stream increases, the time spent within each segment concomitantly decreases. As such, the present embodiments provide for a flashline heater that is capable of producing fluff that is substantially free of entrained hydrocarbon liquids in a shorter transit time compared to flashline heaters having diameters less than about 4 inches. In the embodiment represented by Table 1, the total calculated transit time of the slurry through the flashline is about 7.62 seconds, with the first portion of the liquid being substantially totally vaporized about 3.7 seconds before exiting the flashline.

While Table 1 provides calculations of a modeled embodiment where a flashline heater has a large diameter and a conventional length, Table 2 provides calculations where a flashline heater has a large diameter and a long length (e.g., greater than 400 feet), which in Table 2 is about 720 feet. It should be noted that the trends of the calculated data provided in Table 2 generally follow the trends of the calculated data provided in Table 1. However, due to the longer length of the flashline of Example 2, the transit time increases from Example 1 to Example 2 from about 7.62 seconds to about 13.37 seconds. Further, as the discharge stream is heated substantially continuously (every fifth segment is turned off), the resulting temperature of the stream of vapor and fluff is higher, with the temperature being about 194.2° F. at the exit of segment number 45 in Example 2, and the temperature being about 175.8° F. at the exit of segment number 26 in Example 1.

TABLE 2

REPORT LINE SEGMENT RESULTS, 720' × 6" Flashline Heater, Example 2

| SEG NO | LENGTH (ft) | OUTLET PRESS (PSIA) | PRESS DROP (PSI) | OVERALL Uo (BTU/h-ft2-° F.) | OUTLET WT FRACTION OF VAPOR | OUTLET TEMP (° F.) | AVG. VELOCITY (ft/sec) | DUTY (1000 BTU/h) | Time in FLH (sec) |
|---|---|---|---|---|---|---|---|---|---|
| 1 | 10 | 196.3 | 1.7 | 0 | 0.6917 | 161.1 | 39.3 | 0 | 0.25 |
| 2 | 20 | 193.7 | 2.6 | 90.7 | 0.7218 | 160.5 | 41.2 | 93.8 | 0.49 |
| 3 | 20 | 191.1 | 2.6 | 90.6 | 0.752 | 159.9 | 43.1 | 95.3 | 0.46 |
| 4 | 20 | 188.5 | 2.61 | 90.5 | 0.7827 | 159.2 | 45.1 | 96.4 | 0.44 |
| 5 | 20 | 186.7 | 1.78 | 90.4 | 0.811 | 158.8 | 46.9 | 97.2 | 0.43 |
| 6 | 10 | 186.1 | 0.61 | 0 | 0.8131 | 158.5 | 47.2 | 0 | 0.21 |
| 7 | 20 | 185.1 | 0.94 | 90.2 | 0.8388 | 158.4 | 48.6 | 79.9 | 0.41 |
| 8 | 20 | 184.2 | 0.93 | 90.2 | 0.8645 | 158.3 | 50.1 | 98.1 | 0.4 |
| 9 | 20 | 183.3 | 0.93 | 90.1 | 0.8905 | 158.2 | 51.6 | 98.5 | 0.39 |
| 10 | 20 | 182.3 | 0.92 | 90 | 0.9164 | 158.1 | 53.1 | 98.6 | 0.38 |
| 11 | 10 | 181.8 | 0.59 | 0 | 0.9183 | 157.8 | 53.4 | 0 | 0.19 |
| 12 | 20 | 180.8 | 0.91 | 89.9 | 0.9444 | 157.7 | 54.9 | 99.2 | 0.36 |
| 13 | 20 | 180 | 0.9 | 89.8 | 0.9688 | 157.5 | 56.4 | 99.1 | 0.35 |
| 14 | 20 | 179.1 | 0.89 | 89.8 | 1 | 157.6 | 58.1 | 99 | 0.34 |
| 15 | 20 | 178.3 | 0.76 | 89.6 | 1 | 160.1 | 59.1 | 93.5 | 0.34 |
| 16 | 10 | 177.8 | 0.51 | 0 | 1 | 160 | 59.3 | 0 | 0.17 |
| 17 | 20 | 177 | 0.77 | 89.9 | 1 | 162.4 | 60.1 | 89.5 | 0.33 |
| 18 | 20 | 176.3 | 0.77 | 90.1 | 1 | 164.6 | 60.9 | 85.5 | 0.33 |
| 19 | 20 | 175.5 | 0.77 | 90.3 | 1 | 166.7 | 61.6 | 81.7 | 0.32 |
| 20 | 20 | 174.7 | 0.78 | 90.5 | 1 | 168.8 | 62.4 | 78.1 | 0.32 |
| 21 | 10 | 174.2 | 0.52 | 0 | 1 | 168.7 | 62.6 | 0 | 0.16 |
| 22 | 20 | 173.4 | 0.78 | 90.7 | 1 | 170.6 | 63.3 | 74.7 | 0.32 |
| 23 | 20 | 172.6 | 0.78 | 90.9 | 1 | 172.5 | 64.1 | 71.4 | 0.31 |

TABLE 2-continued

REPORT LINE SEGMENT RESULTS, 720' × 6" Flashline Heater, Example 2

| SEG NO | LENGTH (ft) | OUTLET PRESS (PSIA) | PRESS DROP (PSI) | OVERALL Uo (BTU/h-ft2-° F.) | OUTLET WT FRACTION OF VAPOR | OUTLET TEMP (° F.) | AVG. VELOCITY (ft/sec) | DUTY (1000 BTU/h) | Time in FLH (sec) |
|---|---|---|---|---|---|---|---|---|---|
| 24 | 20 | 171.8 | 0.78 | 91.1 | 1 | 174.2 | 64.8 | 68.2 | 0.31 |
| 25 | 20 | 171.1 | 0.79 | 91.3 | 1 | 175.9 | 65.5 | 65.2 | 0.31 |
| 26 | 10 | 170.5 | 0.53 | 0 | 1 | 175.9 | 65.7 | 0 | 0.15 |
| 27 | 20 | 169.7 | 0.79 | 91.5 | 1 | 177.5 | 66.4 | 62.3 | 0.3 |
| 28 | 20 | 168.9 | 0.79 | 91.7 | 1 | 179 | 67.1 | 59.6 | 0.3 |
| 29 | 20 | 168.1 | 0.8 | 91.8 | 1 | 180.4 | 67.7 | 56.9 | 0.3 |
| 30 | 20 | 167.3 | 0.8 | 92 | 1 | 181.8 | 68.4 | 54.3 | 0.29 |
| 31 | 10 | 166.8 | 0.54 | 0 | 1 | 181.8 | 68.6 | 0 | 0.15 |
| 32 | 20 | 166 | 0.8 | 92.1 | 1 | 183.1 | 69.3 | 51.9 | 0.29 |
| 33 | 20 | 165.2 | 0.8 | 92.3 | 1 | 184.4 | 69.9 | 49.6 | 0.29 |
| 34 | 20 | 164.4 | 0.81 | 92.4 | 1 | 185.6 | 70.6 | 47.4 | 0.28 |
| 35 | 20 | 163.6 | 0.81 | 92.5 | 1 | 186.7 | 71.2 | 45.2 | 0.28 |
| 36 | 10 | 163 | 0.54 | 0 | 1 | 186.7 | 71.5 | 0 | 0.14 |
| 37 | 20 | 162.2 | 0.81 | 92.7 | 1 | 187.8 | 72.1 | 43.2 | 0.28 |
| 38 | 20 | 161.4 | 0.81 | 92.8 | 1 | 188.8 | 72.8 | 41.2 | 0.27 |
| 39 | 20 | 160.6 | 0.82 | 92.9 | 1 | 189.9 | 73.4 | 39.4 | 0.27 |
| 40 | 20 | 159.8 | 0.82 | 93 | 1 | 190.8 | 74 | 37.6 | 0.27 |
| 41 | 10 | 159.2 | 0.55 | 0 | 1 | 190.8 | 74.3 | 0 | 0.13 |
| 42 | 20 | 158.4 | 0.82 | 93.1 | 1 | 191.7 | 74.9 | 35.9 | 0.27 |
| 43 | 20 | 157.5 | 0.82 | 93.2 | 1 | 192.6 | 75.6 | 34.3 | 0.26 |
| 44 | 20 | 156.8 | 0.83 | 93.3 | 1 | 193.4 | 76.2 | 32.7 | 0.26 |
| 45 | 20 | 155.5 | 1.29 | 93.4 | 1 | 194.2 | 77.1 | 31.3 | 0.26 |
| | | | | Total Time From Total Vaporization to End of FLH = 8.26 | | | | Total Duty (mmBTU/hr) | Total Time (sec) |
| | | | | | | | | 2503.7 | 13.37 |

As noted above, in some situations, the temperature resulting from heating the stream of vapor and fluff substantially continuously through the length of the flashline heater may result in a temperature at which the fluff may partially or completely melt, which creates difficulty for processing the fluff after exiting the flashline. That is, the temperature resulting from substantially continuous heating may be too high for some polymers. Therefore, in some embodiments, it may be desirable to heat the discharge stream or stream of vapor and fluff through only a portion of the flashline heater. Such a configuration is represented by the calculations provided in Table 3, which shows calculated data modeling the process of heating the discharge stream through the first 25 segments (with every fifth segment turned off) of a flashline heater having a length of about 700 feet and a diameter of about 6 inches.

TABLE 3

REPORT LINE SEGMENT RESULTS, 700' × 6" Flashline Heater, Example 3

| SEG NO | LENGTH (ft) | OUTLET PRESS (PSIA) | PRESS DROP (PSI) | OVERALL $U_o$ (BTU/h-ft²-° F.) | OUTLET WT FRACTION OF VAPOR | OUTLET TEMP (° F.) | AVG. VELOCITY (ft/sec) | DUTY (1000 BTU/h) | Time in FLH (sec) |
|---|---|---|---|---|---|---|---|---|---|
| 1 | 10 | 196.3 | 1.7 | 0 | 0.6917 | 161.1 | 39.3 | 0 | 0.25 |
| 2 | 20 | 193.7 | 2.6 | 90.7 | 0.7218 | 160.5 | 41.2 | 93.8 | 0.49 |
| 3 | 20 | 191.1 | 2.6 | 90.6 | 0.752 | 159.9 | 43.1 | 95.3 | 0.46 |
| 4 | 20 | 188.5 | 2.61 | 90.5 | 0.7827 | 159.2 | 45.1 | 96.4 | 0.44 |
| 5 | 20 | 186.7 | 1.78 | 90.4 | 0.811 | 158.8 | 46.9 | 97.2 | 0.43 |
| 6 | 10 | 186.1 | 0.61 | 0 | 0.8131 | 158.5 | 47.2 | 0 | 0.21 |
| 7 | 20 | 185.1 | 0.94 | 90.2 | 0.8388 | 158.4 | 48.6 | 97.9 | 0.41 |
| 8 | 20 | 184.2 | 0.93 | 90.2 | 0.8645 | 158.3 | 50.1 | 98.1 | 0.4 |
| 9 | 20 | 183.3 | 0.93 | 90.1 | 0.8905 | 158.2 | 51.6 | 98.5 | 0.39 |
| 10 | 20 | 182.3 | 0.92 | 90 | 0.9164 | 158.1 | 53.1 | 98.6 | 0.38 |
| 11 | 10 | 181.8 | 0.59 | 0 | 0.9183 | 157.8 | 53.4 | 0 | 0.19 |
| 12 | 20 | 180.8 | 0.91 | 89.9 | 0.9444 | 157.7 | 54.9 | 99.2 | 0.36 |
| 13 | 20 | 180 | 0.9 | 89.8 | 0.9688 | 157.5 | 56.4 | 99.1 | 0.35 |
| 14 | 20 | 179.1 | 0.89 | 89.8 | 1 | 157.6 | 58.1 | 99 | 0.34 |
| 15 | 20 | 178.3 | 0.76 | 89.6 | 1 | 160.1 | 59.1 | 93.5 | 0.34 |
| 16 | 10 | 177.8 | 0.51 | 0 | 1 | 160 | 59.3 | 0 | 0.17 |
| 17 | 20 | 177 | 0.77 | 89.9 | 1 | 162.4 | 60.1 | 89.5 | 0.33 |
| 18 | 20 | 176.3 | 0.77 | 90.1 | 1 | 164.6 | 60.9 | 85.5 | 0.33 |
| 19 | 20 | 175.5 | 0.77 | 90.3 | 1 | 166.7 | 61.6 | 81.7 | 0.32 |
| 20 | 20 | 174.7 | 0.78 | 90.5 | 1 | 168.8 | 62.4 | 78.1 | 0.32 |
| 21 | 10 | 174.2 | 0.52 | 0 | 1 | 168.7 | 62.6 | 0 | 0.16 |
| 22 | 20 | 173.4 | 0.78 | 90.7 | 1 | 170.6 | 63.3 | 74.7 | 0.32 |
| 23 | 20 | 172.6 | 0.78 | 90.9 | 1 | 172.5 | 64.1 | 71.4 | 0.31 |
| 24 | 20 | 171.8 | 0.78 | 91.1 | 1 | 174.2 | 64.8 | 68.2 | 0.31 |
| 25 | 20 | 171.1 | 0.79 | 91.3 | 1 | 175.9 | 65.5 | 65.2 | 0.31 |

TABLE 3-continued

REPORT LINE SEGMENT RESULTS, 700' × 6" Flashline Heater, Example 3

| SEG NO | LENGTH (ft) | OUTLET PRESS (PSIA) | PRESS DROP (PSI) | OVERALL $U_o$ (BTU/h-ft$^2$-° F.) | OUTLET WT FRACTION OF VAPOR | OUTLET TEMP (° F.) | AVG. VELOCITY (ft/sec) | DUTY (1000 BTU/h) | Time in FLH (sec) |
|---|---|---|---|---|---|---|---|---|---|
| 26 | 10 | 170.5 | 0.53 | 0 | 1 | 175.9 | 65.7 | 0 | 0.15 |
| 27 | 20 | 169.7 | 0.78 | 0 | 1 | 175.8 | 66.1 | 0 | 0.3 |
| 28 | 20 | 169 | 0.78 | 0 | 1 | 175.8 | 66.4 | 0 | 0.3 |
| 29 | 20 | 168.2 | 0.78 | 0 | 1 | 175.7 | 66.8 | 0 | 0.3 |
| 30 | 20 | 167.4 | 0.79 | 0 | 1 | 175.6 | 67.2 | 0 | 0.3 |
| 31 | 10 | 166.9 | 0.53 | 0 | 1 | 175.6 | 67.4 | 0 | 0.15 |
| 32 | 20 | 166.1 | 0.79 | 0 | 1 | 175.5 | 67.8 | 0 | 0.29 |
| 33 | 20 | 165.3 | 0.79 | 0 | 1 | 175.5 | 68.2 | 0 | 0.29 |
| 34 | 20 | 164.5 | 0.79 | 0 | 1 | 175.4 | 68.6 | 0 | 0.29 |
| 35 | 20 | 163.7 | 0.79 | 0 | 1 | 175.4 | 68.9 | 0 | 0.29 |
| 36 | 10 | 163.2 | 0.54 | 0 | 1 | 175.3 | 69.2 | 0 | 0.14 |
| 37 | 20 | 162.4 | 0.8 | 0 | 1 | 175.3 | 69.6 | 0 | 0.29 |
| 38 | 20 | 161.6 | 0.8 | 0 | 1 | 175.2 | 70 | 0 | 0.29 |
| 39 | 20 | 160.8 | 0.8 | 0 | 1 | 175.2 | 70.4 | 0 | 0.28 |
| 40 | 20 | 160 | 0.8 | 0 | 1 | 175.1 | 70.8 | 0 | 0.28 |
| 41 | 10 | 159.4 | 0.54 | 0 | 1 | 175.1 | 71.1 | 0 | 0.14 |
| 42 | 20 | 158.6 | 0.8 | 0 | 1 | 175 | 71.5 | 0 | 0.28 |
| 43 | 20 | 157.8 | 0.81 | 0 | 1 | 174.9 | 72 | 0 | 0.28 |
| 44 | 20 | 157 | 0.81 | 0 | 1 | 174.9 | 72.4 | 0 | 0.28 |
| | | | | Total Time From Total Vaporization to End of FLH = 8.49 | | | | Total Duty (mmBTU/hr) | Total Time (sec) |
| | | | | | | | | 1780.9 | 13.26 |

In the embodiment represented by Example 3, the trend of increasing average velocity and outlet temperature generally follows the trends set forth in Examples 1 and 2. Further, even though the discharge stream (or stream of vapor and fluff) is not heated after the 25th segment, the average velocity continues to increase, which may be due, at least in part, to the second portion of hydrocarbon liquid (the liquid entrained within the fluff) being volatilized away from the fluff. Other contributing factors may include the pressure differential from the beginning to the end of the flashline, the temperature differential through the flashline, and so forth. However, by ceasing to heat the discharge stream or stream of vapor and fluff after the 25th segment, the velocity of the stream does not increase by the same magnitude as the stream in the embodiment represented by Example 2. Therefore, even though the embodiment of Example 3 is about 20 feet shorter, more time is spent within the flashline of Example 3 compared to Example 2.

In Example 3, the stream is heated until an outlet temperature of 175.9° F. is reached, which may be below the temperature at which the fluff may begin to melt. While the flashline heater of the present embodiment ceases to heat at 175.9° F., it should be noted that a variety of temperatures may be suitable, such as the glass transition temperature ($T_g$) of a given polymer fluff, the boiling point of a given diluent, the boiling point of the heaviest liquid polymerization component, and so on. Nevertheless, in the embodiment of Example 3, the stream maintains a temperature within about 1° F. of the maximum temperature, which may be advantageous for the removal of the second portion of liquid from the fluff. Further, as noted above, the stream of vapor and fluff is able to spend a longer period of time under hydrocarbon volatilization conditions before exiting the flashline compared to conventional flashline configurations.

TABLE 4

Effect of Length and Diameter on Drying, Transit Time, and Fluff Temperature

| Example No. | flashline length (feet) | flashline diameter (inches) | Time from vaporization to end of FLH (sec) | Total transit time in FLH (sec) | Max Temp after volatilization (° F.) |
|---|---|---|---|---|---|
| 1 | 400 | 6 | 3.7 | 7.62 | 175.9 |
| 2 | 720 | 6 | 8.26 | 13.37 | 194.2 |
| 3 | 700 | 6 | 8.49 | 13.26 | 175.9 |

Table 4 provides a comparison between the three embodiments represented by Examples 1-3. It may be appreciated with respect to Example 1 that by increasing the diameter of a flashline heater having a conventional length, more time may be provided from complete vaporization of the first portion of liquid to when the stream exits the flashline. Example 2 represents an increased amount of time from complete volatilization to exiting the flashline when compared to Example 1 due to the longer length of the representative flashline. However, the maximum temperature of the fluff in Example 2 reaches 194.2° F., which may be above the temperature at which the fluff within the stream may begin to melt. As such, Example 3 provides for the discharge stream to be heated only through a portion of the flashline heater, such that the maximum temperature reached by the fluff may be about the same for longer (above about 400 feet) flashlines compared to conventional (shorter than about 400 feet) flashlines. Therefore, it should be noted that by only heating the stream through the first 25 segments in Example 3, the fluff reaches substantially the same maximum temperature as the maximum temperature reached in Example 1, which is about 240 feet shorter.

In addition to the embodiments described above with respect to the structure of a flashline heater, the present embodiments also provide a method 120 of liquids volatilization within a flashline heater, such as the flashline heater 64 of FIGS. 2 and 3. In a first step, a portion of slurry is withdrawn from a polymerization reactor and into the flashline heater, as represented by block 122. The withdrawal may be substantially continuous, or may be performed periodically, such as when the polymerization reactor reaches a defined pressure. Nevertheless, the flashline heater receives a discharge stream of slurry. As the stream flows through the flashline heater, it is heated and experiences a reduction in pressure. The reduction in pressure may be due, at least in part, to reduced pressure within the flashline heater compared to the pressure within the polymerization reactor.

As the stream is heated and reduced in pressure, a first portion of liquid (the liquid not entrained within the polymer fluff), is volatilized as represented by block 124. That is, the main portion of the liquid components of the polymerization reaction within the slurry is volatilized, including the diluent, monomer, comonomer, cocatalysts, additives, and so forth. This main portion is not entrained within the fluff, but serves to suspend the polymer fluff and catalyst on solid support as it circulates within the polymerization reactor. It should be noted, however, that a small portion of the liquid entrained within the fluff may also be volatilized.

As noted above, after the first portion of the liquid volatilizes, the liquid that is entrained within the polymer fluff begins to initially volatilize, which cools the surrounding polymer fluff and, therefore, any remaining liquid that may still be entrained within the fluff. The first portion of the liquid may be volatilized at a given time prior to exiting the flashline, for example, before entering a flash chamber (e.g., flash chamber 68 of FIG. 2). As noted above, the present embodiments may extend the time between when the first portion of liquid is volatilized and when the stream of vapor and fluff exit the flashline. As an example, the first portion of the liquid may be volatilized at least 2 seconds, 2.5 seconds, 3 seconds, 3.5 seconds, 4 seconds, 4.5 seconds, 5 seconds or more prior to exiting the flashline and entering the flash chamber. Within this time, the stream having the volatilized first portion of hydrocarbon liquids, a portion of the volatilized second portion of hydrocarbon liquids, and the polymer fluff (and therefore the liquid that is still entrained within the fluff) continues to be heated. During this extra time within the flashline and depending on a number of factors including the temperature of the warming fluid, the diameter of the flashline, the chemical identity of the polymerization components, and so forth, the temperature of the volatilized first portion of hydrocarbon liquids, the portion of the volatilized second portion of hydrocarbon liquids, the polymer fluff, and the liquid that is still entrained within the fluff all reach a temperature equilibrium, or a point at which their temperatures differ by no more than about 20%, 10%, 1%, 0.5%, 0.1%, 0.05%, or 0.01%, which is represented by block 126. At such a time, the second portion of liquid (the liquid that is or was entrained within the fluff) may be substantially volatilized. After the temperature equilibration, the stream of vapor and fluff may then exit the flashline heater for further processing, such as to a vaporization chamber where the vaporized portions of the stream are removed from the fluff, as described above with respect to FIGS. 1 and 2.

The present embodiments provide a system and method for separation within a polymer production process. Specifically, a flashline heater configured according to present embodiments may provide more time than is required for complete vaporization of liquid hydrocarbons that are not entrained within a polymer fluff produced within a polymerization reactor. Such extra time may allow for liquid hydrocarbons that are entrained within the polymer fluff to be vaporized.

Additional Description

The present embodiments provide a system and method for separation within a polymer production process. The following clauses are offered as further description of the present disclosure:

Embodiment 1

A flashline heater configured to receive a discharged stream from a polymerization reactor and deliver the discharged stream to a separation vessel, the discharged stream comprising a liquid part and a solid part upon entry into the flashline heater, wherein the flashline heater is configured to vaporize a portion of the liquid part to generate a vapor part, such that the vapor part, the liquid part, and the solid part have respective temperatures that differ by less than approximately 5° F. at an exit of the flashline heater.

Embodiment 2

The flashline heater according to embodiment 1, wherein the liquid part comprises a first portion and a second portion, wherein the first portion is not entrained in the solid part and the second portion is entrained in the solid part, and wherein the flashline heater is configured to vaporize substantially all of the first portion at least approximately 2.5 seconds before reaching the separation vessel.

Embodiment 3

The flashline heater according to either of embodiments 1 or 2, wherein the flashline heater is configured to deliver the discharged slurry stream to the separation vessel to vaporize substantially all of the liquid that is not vaporized in the flashline heater.

Embodiment 4

The flashline heater according to any preceding embodiment, wherein the flashline heater comprises a plurality of separate heat-variable sections configured to adjust a temperature of the discharged stream.

Embodiment 5

The flashline heater according to any preceding embodiment, wherein the flashline heater is configured to provide varying amounts of heat to the discharge stream along its length.

Embodiment 6

The flashline heater according to any preceding embodiment, wherein the flashline heater comprises a first plurality of heat-variable sections and a second plurality of heat-variable sections, the first plurality of heat-variable sections being configured to raise the temperature of the discharged slurry stream, and the second plurality of heat-variable sections being configured to maintain or lower the temperature of the discharged stream to prevent melting of the solid part.

Embodiment 7

The flashline heater according to any preceding embodiment, wherein the flashline heater is configured to deliver the vapor part, the liquid part, and the solid part to the separation vessel at thermal equilibrium.

Embodiment 8

The flashline heater according to any preceding embodiment, wherein the total transit time of the discharge stream through the flashline heater is at least approximately 8 seconds.

Embodiment 9

The flashline heater according to any preceding embodiment, wherein the flashline heater has a length of approximately at least 720 feet.

Embodiment 10

The flashline heater according to any preceding embodiment, wherein the flashline comprises an internal diameter of at least approximately 4 inches.

Embodiment 11

The flashline heater according to any preceding embodiment, wherein the solid part comprises a polyolefin fluff, and an outlet temperature measured at a downstream end of the flashline heater is less than or equal to the melting temperature of the polyolefin fluff.

Embodiment 12

A method of separation within a polymer production process, comprising the acts of: receiving a discharged stream in a flashline heater, the discharged stream comprising a liquid part and a solid part upon entry into the flashline heater; heating the discharged stream in the flashline heater as the discharged stream passes along a length of the flashline heater such that at least a portion of the liquid part vaporizes to generate a vapor part, wherein a transit time of the discharged stream through the flashline heater is at least approximately 8 seconds; and equilibrating the temperature between the solid part and the vapor part during the at least approximately 8 seconds within the flashline heater.

Embodiment 13

The method according to embodiment 12, wherein equilibrating the temperature comprises heating and reducing the pressure of the discharged stream such that a temperature difference of less than about 1° F. exists between the solid part and the vapor part, and the solid part and the liquid part have respective temperatures within approximately 5° F. of a volatilization temperature of the liquid.

Embodiment 14

The method according to either of embodiments 12 or 13, wherein heating the discharged stream in the flashline heater comprises heating the discharged stream in a first section of the flashline heater and reducing or maintaining the temperature of the discharged stream in a second section of the flashline heater.

Embodiment 15

The method according to any of embodiments 12-14, wherein the liquid part comprises a first portion and a second portion, wherein the first portion is not entrained in the solid part and the second portion is entrained in the solid part, and wherein heating the discharged stream within the flashline heater comprises vaporizing substantially all of the first portion at least approximately 2.5 seconds before reaching an exit of the flashline heater.

Embodiment 16

The method according to any of embodiments 12-15, comprising receiving the discharged stream in a separation vessel from the flashline heater, vaporizing an additional portion of the liquid part in the separation vessel, discharging at least a portion of the solid part from the separation vessel into a conduit, and providing additional heat to the portion of the solid part within the conduit.

Embodiment 17

The method according to any of embodiments 12-16, comprising discharging at least a portion of the solid part from the separation vessel into the conduit via a continuous take off (CTO) feature disposed on the separation vessel.

Embodiment 18

The method according to any of embodiments 12-17, comprising heating the solid part to within about 50° F. of the temperature utilized for extrusion at an extruder disposed downstream of the conduit.

Embodiment 19

The method according to any of embodiments 12-18, comprising heating the vapor part above the melting temperature of the solids part within the separation vessel.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method, comprising:
polymerizing an olefin monomer in a reactor using an olefin polymerization catalyst to generate a polymer slurry, wherein the polymer slurry includes polymer fluff and liquid;
receiving a discharge stream comprising the polymer slurry from the reactor in a flashline heater;
heating the discharge stream in the flashline heater such that the liquid, including liquid entrained within the polymer fluff, vaporizes, wherein the polymer fluff and the vapor generated from vaporization of the liquid substantially reach thermal equilibrium with one another within the flashline heater;

receiving the discharge stream in a flash chamber from an outlet of the flashline heater;

separating the discharge stream into flash gas and a polymer fluff stream; and discharging the flash gas as an overhead discharge from the flash chamber, wherein at least 98% of the overhead discharge corresponds to the vapor received from the outlet of the flashline heater.

2. The method of claim 1, comprising generating polyolefin pellets from the polymer fluff stream downstream of the flash chamber.

3. The method of claim 1, comprising discharging the polymer fluff stream directly from the flash chamber to a purge column.

4. The method of claim 1, wherein heating the discharge stream in the flashline heater such that the liquid, including liquid entrained in the polymer fluff, vaporizes, comprises directing the discharge stream through the flashline heater for at least 8 seconds.

5. The method of claim 1, wherein a temperature difference between the polymer fluff and the vapor exiting the flashline heater is less than 1° F.

6. The method of claim 1, wherein heating the discharge stream in the flashline heater such that the liquid, including liquid entrained in the polymer fluff, vaporizes, comprises supplying heat to a first section of the flashline heater using a heat exchange medium and not supplying heat to a second section of the flashline heater.

7. The method of claim 1, wherein the liquid of the polymer slurry, upon entry into the flashline heater, includes a first portion and a second portion, wherein the first portion is not entrained in the polymer fluff and the second portion is entrained in the polymer fluff, and wherein the polymer fluff and the vapor substantially reach thermal equilibrium with one another at least 2.5 seconds before reaching the flash chamber.

8. The method of claim 1, wherein the liquid of the polymer slurry, upon entry into the flashline heater, includes a first portion and a second portion, wherein the first portion is not entrained in the polymer fluff and the second portion is entrained in the polymer fluff, and wherein the polymer fluff and the vapor substantially reach thermal equilibrium with one another at least 5 seconds before reaching the flash chamber.

9. The method of claim 8, wherein the vapor comprises substantially all of the second portion at the outlet of the flashline heater.

10. A method, comprising:
polymerizing an olefin monomer in a reactor using an olefin polymerization catalyst to generate a polymer slurry, wherein the polymer slurry includes polymer fluff and liquid;
receiving the polymer slurry discharged from the reactor in a flashline heater; and
heating the discharged polymer slurry in the flashline heater such that at least 75% of the liquid, including liquid entrained within the polymer fluff, vaporizes, and wherein vapor generated from vaporizing the liquid and the polymer fluff are substantially in thermal equilibrium with one another at a discharge end of the flashline heater.

11. The method of claim 10, comprising generating polyolefin pellets from the polymer fluff stream downstream of the flash chamber.

12. The method of claim 10, wherein at least 98% of the liquid vaporizes.

13. The method of claim 10, wherein heating the discharged polymer slurry in the flashline heater such that at least 75% of the liquid vaporizes, comprises directing the discharged polymer slurry through the flashline heater for at least 8 seconds.

14. The method of claim 10, wherein the liquid of the polymer slurry, upon entry into the flashline heater, includes a first portion and a second portion, wherein the first portion is not entrained in the polymer fluff and the second portion is entrained in the polymer fluff, and wherein the polymer fluff and the vapor substantially reach thermal equilibrium with one another at least 5 seconds before reaching the discharge end of the flashline heater.

15. The method of claim 14, wherein the vapor comprises substantially all of the second portion at the discharge end of the flashline heater.

16. A method, comprising:
polymerizing an olefin monomer in a reactor using an olefin polymerization catalyst to generate a polymer slurry, wherein the polymer slurry includes polymer fluff and liquid;
receiving a discharge stream comprising the polymer slurry from the reactor in a flashline heater;
heating the discharge stream in the flashline heater such that the liquid vaporizes;
receiving the discharge stream in a flash chamber from an outlet of the flashline heater;
separating the discharge stream into flash gas and a polymer fluff stream; and
extruding the polymer fluff stream to form one or more pellets in an extrusion/load out system, wherein a temperature of the polymer fluff stream received by the extrusion/load out system is within 25° F. of a melting point of the polymer fluff stream.

17. The method of claim 16, comprising discharging the polymer fluff stream from the flash chamber directly to a purge column positioned upstream of the extrusion/load out system.

18. The system of claim 17, comprising removing residual olefin polymerization catalyst and the remaining liquid in the purge column.

19. The method of claim 16, wherein the temperature of the polymer fluff stream received by the extrusion/load out system is within 1° F. of a melting point of the polymer fluff stream.

* * * * *